(12) United States Patent
Takamoto et al.

(10) Patent No.: US 7,219,191 B2
(45) Date of Patent: May 15, 2007

(54) DATA SHARING METHOD AMONG REMOTE COMPUTER SYSTEMS AND DISK CONTROL DEVICE THEREOF

(75) Inventors: Yoshifumi Takamoto, Kokubunji (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 10/650,828

(22) Filed: Aug. 29, 2003

(65) Prior Publication Data
US 2004/0193796 A1 Sep. 30, 2004

(30) Foreign Application Priority Data
Mar. 28, 2003 (JP) ............................. 2003-091666

(51) Int. Cl.
*G06F 13/00* (2006.01)
(52) U.S. Cl. ..................................... 711/112; 711/162
(58) Field of Classification Search ................ 711/113, 711/114, 162, 112
See application file for complete search history.

(56) References Cited

U.S. PATENT DOCUMENTS

| 5,835,940 | A | 11/1998 | Yorimitsu et al. |
| 6,353,878 | B1 * | 3/2002 | Dunham ...................... 711/162 |
| 6,446,175 | B1 * | 9/2002 | West et al. .................. 711/162 |
| 6,591,351 | B1 | 7/2003 | Urabe et al. ................. 711/162 |
| 6,728,849 | B2 * | 4/2004 | Kodama ...................... 711/162 |
| 6,859,824 | B1 * | 2/2005 | Yamamoto et al. ......... 709/217 |
| 6,889,233 | B2 | 5/2005 | Lin et al. |
| 2003/0126107 | A1 * | 7/2003 | Yamagami ..................... 707/1 |
| 2003/0131163 | A1 * | 7/2003 | Ishii et al. .................... 710/52 |
| 2004/0034671 | A1 * | 2/2004 | Kodama .................... 707/204 |
| 2004/0073831 | A1 * | 4/2004 | Yanai et al. ................... 714/7 |
| 2004/0107315 | A1 | 6/2004 | Watanabe et al. |

FOREIGN PATENT DOCUMENTS

| JP | 2002-49517 | 2/2002 |
| JP | 2002-149499 | 5/2002 |

* cited by examiner

*Primary Examiner*—Pierre Bataille
*Assistant Examiner*—Sheng-Jen Tsai
(74) *Attorney, Agent, or Firm*—Mattingly, Stanger, Malur & Brundidge, P.C.

(57) ABSTRACT

A data sharing method and disk control device are ideal for running applications to process large amounts of data on remote computers in the same manner as in a database system. A disk control device contains a management table for showing the relation between a remote access identifier, a remote disk control device identifier, and command transfer control information for the remote disk control device to the disk identifier used by the host device, When a write command to write data on a designated disk is received from the host computer, the disc controller executes both a write process for writing data on a designated disk and a command transfer process for transferring a write command to the remote disk controller in accordance with command transfer control information in the management table.

5 Claims, 22 Drawing Sheets

FIG.18

DISK CONTROL TABLE 43

| DISK IDENTIFIER 431 | CAPACITY 432 | DISK TYPE 433 | TRANSMIT CONTROL (CONTRACT STATUS) 434 | REMOTE DISK CONTROL DEVICE IDENTIFIER 435 | REMOTE DISK IDENTIFIER 436 | TRANSFER STATUS FLAG 437 | |
|---|---|---|---|---|---|---|---|
| VOL1 | 10GB | TYPE1 | VIRTUAL | DISK CTL1 | VOL10 | 0 | 430-1 |
| VOL2 | 3GB | TYPE2 | VIRTUAL | DISK CTL2 | VOL10 | 0 | 430-2 |
| VOL3 | 20GB | TYPE3 | VIRTUAL | DISK CTL1 | VOL11 | 0 | 430-3 |
| VOL4 | 10GB | TYPE1 | VIRTUAL | DISK CTL1 | VOL12 | 0 | 430-4 |
| VOL5 | 10GB | TYPE1 | LOCAL | - | - | 0 | 430-5 |
| ... | ... | ... | ... | ... | ... | ... | ... |

FIG.20

COPY MAP

| 1 | 1 | 1 | 1 | 1 | 1 | 1 | 1 |
|---|---|---|---|---|---|---|---|
| 1 | 1 | 1 | 0 | 0 | 0 | 0 | 0 |
| 0 | 0 | 0 | 0 | 0 | 0 | 0 | 0 |
| 0 | 0 | 1 | 1 | 1 | 1 | 0 | 0 |

2201

DATA SHARING METHOD AMONG REMOTE COMPUTER SYSTEMS AND DISK CONTROL DEVICE THEREOF

FIELD OF THE INVENTION

The present invention relates to a data sharing method for use in multiple computer systems and a disk control device for the same.

BACKGROUND OF THE INVENTION

Much progress is being made in remote (control) technology typified by grid technology, wherein one computer on a computer network sends an application to run on another computer, and then commands the running of that application. Applying grid technology, for example, allows high speed processing of large scale scientific and technical calculations so as to obtain the required calculation results, and joint use of high performance computers and scientific and technical data widely dispersed on a global scale. This type of computer network is known to employ the following two methods for jointly sharing data among multiple computers.

In a first method, the computer already holding the data required for data processing (calculation) is requested to run the application. The user making the request investigates ahead of time what data is in what computer. The user then requests processing of data after sending the application to the computer that must execute the application. This method is effective when the remote computer has a sufficiently high speed processor. This method is ideal for joint data sharing methods for the scientific and technical calculation field using high performance computers.

In a second method, the data that must be processed is copied between computers. The computer making the request (or source request computer), first transfers (copies) the required data to the remote computer that will run the application and the requests that the application be run. This method is effective when the processor of the source computer making the request does not have sufficient capacity. However, this method has the problem that when attempting to remotely run an application requiring vast quantities of data, copying the data requires a significant amount of time because copying the data from the source request computer to the remote access computer is performed over a network. Therefore, the first method is generally used when an application must be run on a remote computer already holding the data.

A method is known in the technology of the related art for copying data between computers by a remote copy function contained in the disk control device. Remote copy, as referred to here, is a function wherein two disk control devices send and receive copy data by way of a dedicated channel without using a host device, and they mutually synchronize with and update (rewrite) the data stored in the respective disks. A primary disk control device and a secondary disk control device are defined for the remote copy function. When data is updated (or rewritten) on the primary disk control device, a remote copy mechanism in the primary disk control device transfers that rewritten data automatically to the secondary disk control device and that data then appears in the disk of the secondary disk control device.

Utilizing the remote copy function allows the data stored in two disk control devices at mutually separated locations to be matched (or synchronized) with each other. Therefore, when a problem occurs in the primary disk control device or in the host device (host computer) connected to the primary disk control device, the host device connected to the secondary disk control device allows the task of processing the next data to continue. Examples of use of the remote copy function in the known art are disclosed for example in JP-A No. 149499/2002 (patent document 1) and in JP-A No. 49517/2002 (patent document 2).

[Patent Document]
   JP-A No. 149499/2002

[Patent Document]
   JP-A No. 49517/2002

The above described data sharing methods among computers in grid technology cannot be easily applied to the database field when large amounts of data are involved. Databases are generally managed (operated) by data processing systems possessed by the customer (company). Data sharing among computers, for example, is required when the computational performance (processing ability) of one's own company system is insufficient when attempting to process vast amounts of data on a large scale database.

In this case, the data processed on the computer only exists in the database of that data processing system so that the second (data) sharing method described must be used when attempting to run a database application on another high speed computer that is connected to the network. A long time, however, is required for copying the vast amount of data stored in the database, causing the problem that database processing will stop before copying of the data is complete.

The methods described in patent documents 1 and 2 both have the objective of speeding up or simplifying system recovery after a problem has occurred. These methods do not propose data copying technology for sharing data among computers.

SUMMARY OF THE INVENTION

In view of the above-described problems with the related art, the present invention has the object of providing a data sharing method and disk control device that are ideal for running applications to process large amounts of data on remote computers, the same as in a database system.

To achieve the above objects, the data sharing method of the present invention shares data between a first host computer containing a first disk control device and a second host computer containing a second disk control device, wherein the first disk control device is composed of a remote disk identifier corresponding to an identifier of the disk used by the first host device, an identifier for a remote disk control device for controlling that remote disk, and a control table for showing the relation with command transmit control information sent to the remote disk control device;

The first disk control device, that received the data write command from the first host computer to the specified disk, executes the write command to the specified disk according to command transmit control information for the specified disk shown in the control table, and controls the sending of the write command to the second disk control device.

In a first aspect of the present invention, the first disk control device executes a control procedure for inverting the copy direction of update data on specified disks of the first and second disk control devices, in response to a copy direction invert command from the first host computer, wherein after completion of the control procedure, the first disk control device requests execution of data processing from the first host computer to the second host computer utilizing the specified disk, and in response to a data write command issued by the second host computer during execution of data processing, the second disk control device writes data onto the specified disk in its own device to update the stored data and sends a write command to the specified disk of the device of the other party in order to reflect that data upgrade (rewrite).

In another aspect of the present invention, when the target data is not in the disk cache after the first disk control device has received the data read command for a specified disk from the first host computer, the first disk control device searches the command transmit control information in the control table and determines if the specified disk is a local disk in its own host device or is a virtual disk on the second disk control device. Here, when the specified disk is the local disk, the data read out from that local disk is sent back to the first host device, and when the specified disk is the virtual disk, a request for read out of the target data is made to the second disk control device, and the target data received from that second disk control device is sent back to the first host device.

In the examples of the present invention, when the data write command is sent from the first host computer to the specified disk, the first disk control device temporarily stores the write data in the disk cache. Then, when the specified disk is the local disk in its own (first disk control) device, the data stored in the disk cache is written back into that local disk, and when the specified disk is a virtual disk, a request is then made to the second disk control device to write the stored data back into the virtual disk.

In order to achieve the above objects, the data sharing method of the present invention stores data among a first host computer containing a first disk control device and a second host computer containing a second disk control device, wherein data stored on a specified disk connected to the first disk device is copied in data blocks onto a specified disk of the second disk control device, and before copying of all data blocks is finished, when the target data is not in the disk cache, and if a data block matching the target data is still not copied onto the specified disk connected to the second disk control device, the first disk control device that received the data read command for the specified disk from the first host computer, sends back the data loaded (read) from the specified disk connected to its own device to the first host device, and if a data block matching that target data is already copied in the specified disk connected to the second disk control device, then a request is made to the second disk control device to load (or read) the target data, and the received target data is sent back to the first host device.

After the copying of all data blocks is finished in the above copy process, the specified disk can be changed from the local disk to the virtual disk. A specified disk whose data blocks are all copied can be selected, and the copy direction invert command is sent to switch the data processing from the first host device to the second host device.

The disk control device of the present invention is composed of a remote disk identifier corresponding to the identifier of the local disk contained in the disk device, an identifier for a remote disk control device for controlling that remote disk, and a remote copy control table for showing the relation with command transmit control information sent to the remote disk control device, and a remote copy controller for accessing the disk device according to the command received from the host device, and selectively communicating with the remote disk control device; wherein the remote copy controller contains a means to control the procedure for inverting the copy direction of update data on the specified disk to the remote disk control device in response to a copy direction invert command from the host computer and to rewrite (update) the command transmit control information in the remote copy control table corresponding to the specified disk; and a means for writing data into the specified disk according to the remote copy control table in response to a data write command from the host computer to write data in the designated disk contained in that disk device, and selectively transmitting the data write command to the remote disk control device for reflecting the update data in the remote disk.

The disk control device of the present invention is composed of a remote disk identifier corresponding to the identifier of the disk used by the host device corresponding to the disk, and corresponding to the connection status of that disk, and an identifier for a remote disk control device for controlling that remote disk, and a disk control table for showing the relation with command transmit control information, and a virtual disk controller for accessing the local disk device according to the disk control table as instructed in the command received from the host computer and selectively communicating with the remote disk control device, wherein the virtual disk controller contains a means for receiving the data read command for the specified disk from the host computer, and when the target data is not in the disk cache, deciding from the command transmit information in the disk control table whether the specified disk is the local disk in its own device or a virtual disk in the remote disk control device itself; and a means for sending back the data read (loaded) from the local disk to the host device when the specified disk is the local disk, and requesting the remote disk control device for loading (reading) of target data and sending back the received target data from the remote disk control device to the host device, when the specified disk is a virtual disk.

The disk control device of the aspects of the present invention is characterized in containing a means for intermittently copying stored data in data blocks from a specified disk connected to the local disk device, onto the specified disk on the remote disk control device; and a disk access command from the host computer is executed during the copy processing period by the copy means. Other unique features of the present invention will be clearly described from the following description of the embodiments.

BRIEF DESCRIPTION OF THE DRAWINGS

FIG. 18 is a diagram of the disk control table 43 contained in the host device 10A of the second embodiment;

FIG. 20 is a diagram of the copy map used by the virtual disk controller 41 and the disk transfer controller 45;

DETAILED DESCRIPTION OF THE PREFERRED EMBODIMENTS

Figure 1:
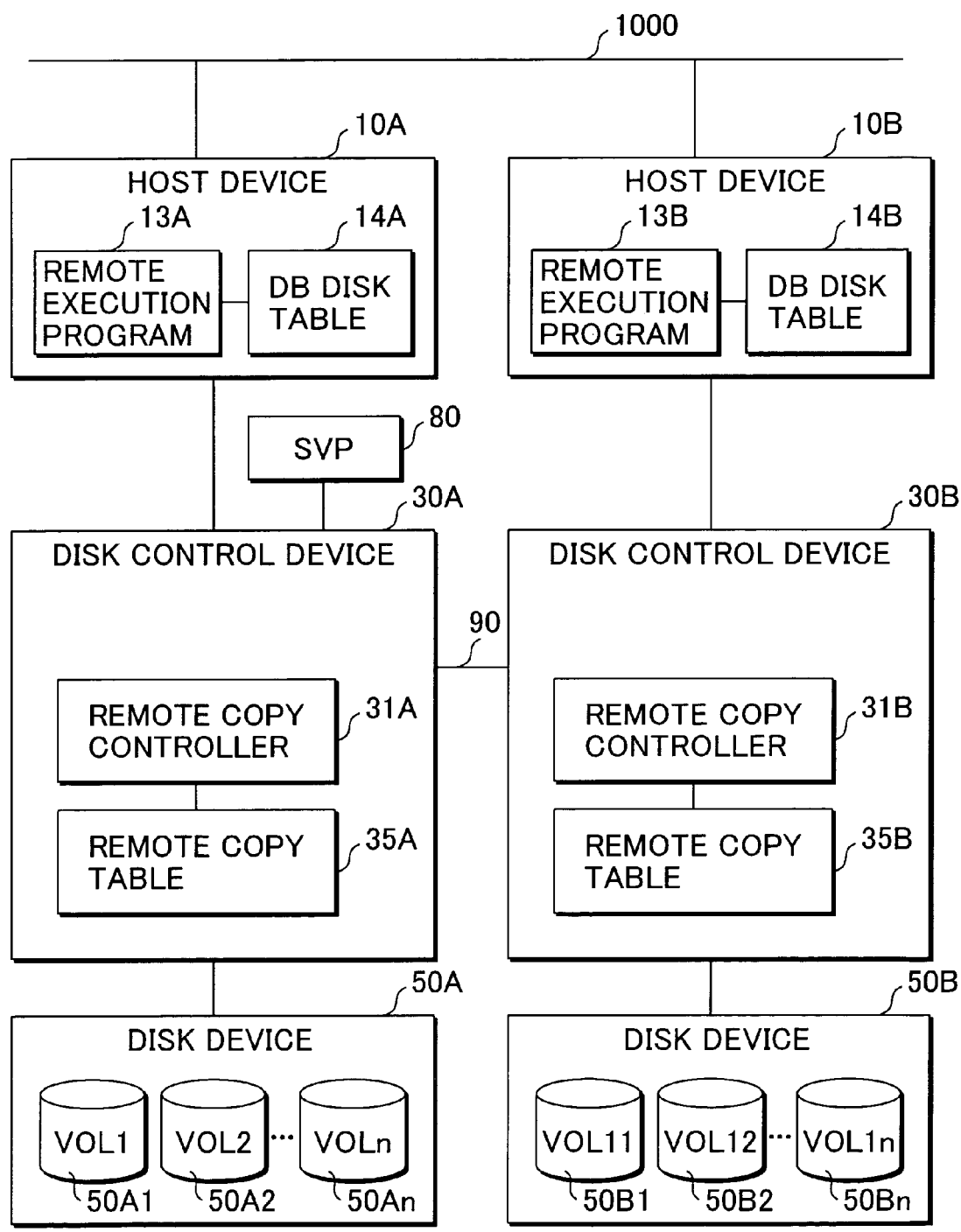
FIG. 1 is a block diagram showing the basic system structure of the computer network for data sharing.

FIG. 1 is a diagram showing the basic system structure of the computer network for data sharing among the remote hosts in accordance with the present invention.

In this figure, reference numeral 10 (10A, 10B) denotes host devices connected to a network 1000. The host devices 10A and 10B contain a remote control program 13 (13A, 13B), and a database disk table 14 (14A, 14B). The remote control program 14 contains a function to send and receive programs, for example, applications, with other host devices by way of the network 1000, and functions to execute the programs. Disk identification information for the database used by each host device is stored in the disk table 14.

A disk control device 30A (30B) is connected to the host device 10A (10B). A service processor (SVP) 80 and a disk drive device 50A (50B), composed of multiple disk drives 50A1 through 50An (50B1 through 50Bn), are connected to the disk control device 30A (30B). The disk control device 30A (30B) possesses a function to analyze and execute the disk input/output request issued from the host device 10A (10B) and to execute the data read/write on the disk drives 50A1 through 50An (50B1 through 50Bn) in response to the disk input/output request (read/write command) issued from the host device 10A (10B). In the following description, the disk drives 50A1 through 50An (50B1 through 50Bn) are hereinafter referred to simply as disk drives for the purpose of simplicity.

In the first embodiment, each disk control device 30 (30A, 30B) contains a remote copy controller 31 (31A, 31B) and a remote copy table 35 (35A, 35B). The functions in each disk control device are usually executed by software run by the local processor within the disk control device. The functions of the remote copy controller 31 are achieved by the remote copy control program to be described later with reference to FIG. 9 through FIG. 12.

The remote copy controller 31 functions are usually utilized for data synchronization with other remote disk devices by way of the channel 90 for the purpose of disaster recovery. In other words, by synchronizing the data between the two disk devices using the remote copy function, the computer (processing) service can continue utilizing the other disk device, when one of the disk devices cannot be accessed.

In the present embodiment, the remote copy function not only has the purpose of protecting data, as in the related art, but it also is utilized for sharing data in the database among multiple host devices (10A, 10B).

Figure 2:
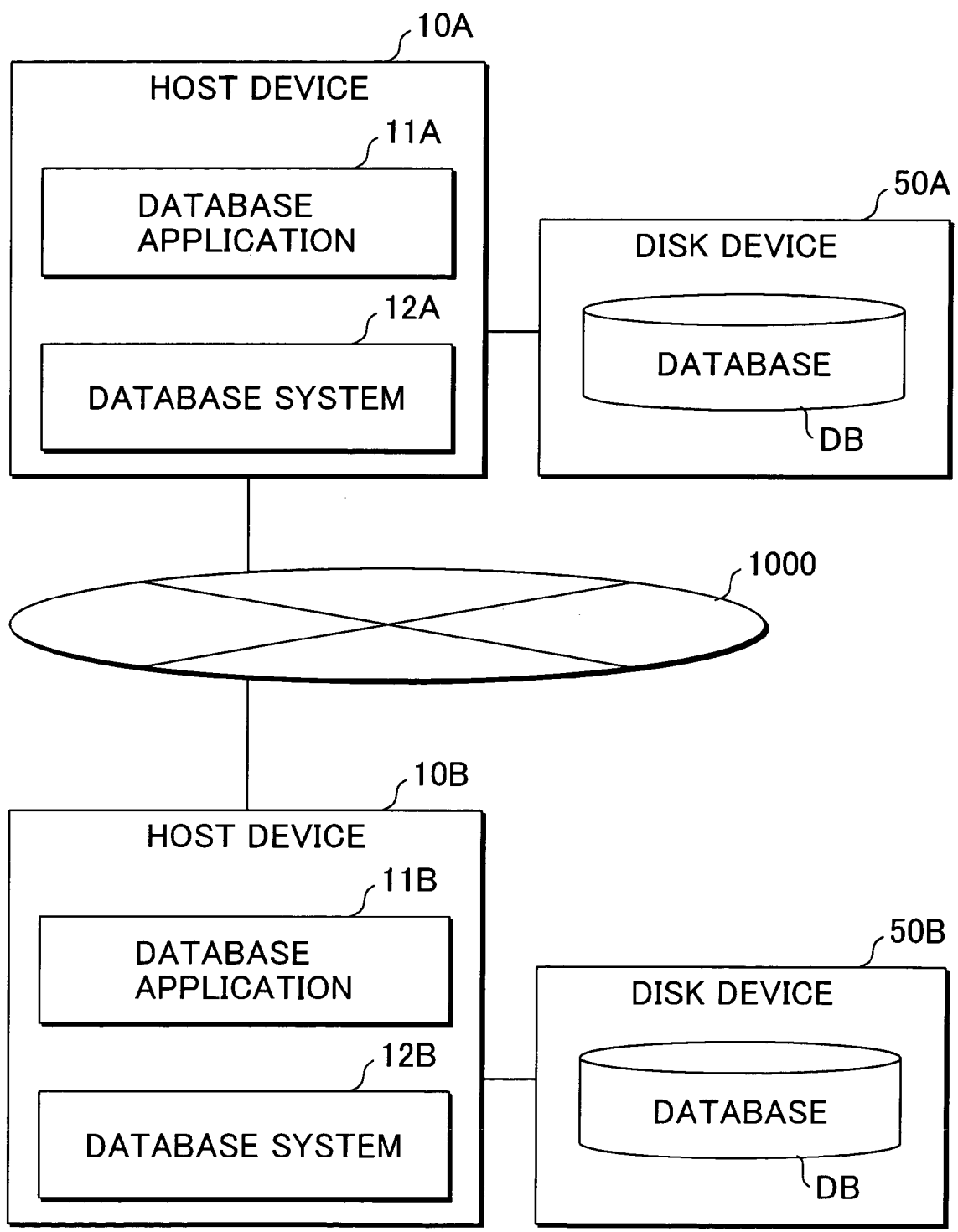
FIG. 2 is a block diagram showing the computer network of the first embodiment of the present invention.

FIG. 2 is a diagram showing one example of data sharing in the computer network.

The database applications 11 (11A, 11B) and the database system 12 (12A, 12B) operate in the two host devices 10A and 10B that are connected by the network 1000. A disk 50 (50A, 50B) is connected to each host device by way of a disk control device (not shown in drawing), and a database DB is established within the disk device 50.

In this embodiment, the remote copy function is utilized so that the host device 10B can remotely run the database application 11A operating in the host device 10A. Here, a precondition is that the database application 11B of host device 10B has the same functions as database application 11A of host device 10A.

In order to process updated database information when running the database application 11(11A, 11B), a request must be made to the host device 10B from the host device 10A to remotely operate the database application 11B.

During running of database application 11A by the host 10A, data changes that occurred in database DB of disk device 50 must be entered at that time in the database DB of host device 50B.

Likewise, during remote operation of database application 11B by host 10B, data changes that occurred in the disk device 50 database DB must be entered at that time in the database of disk device 50A.

Figure 3:
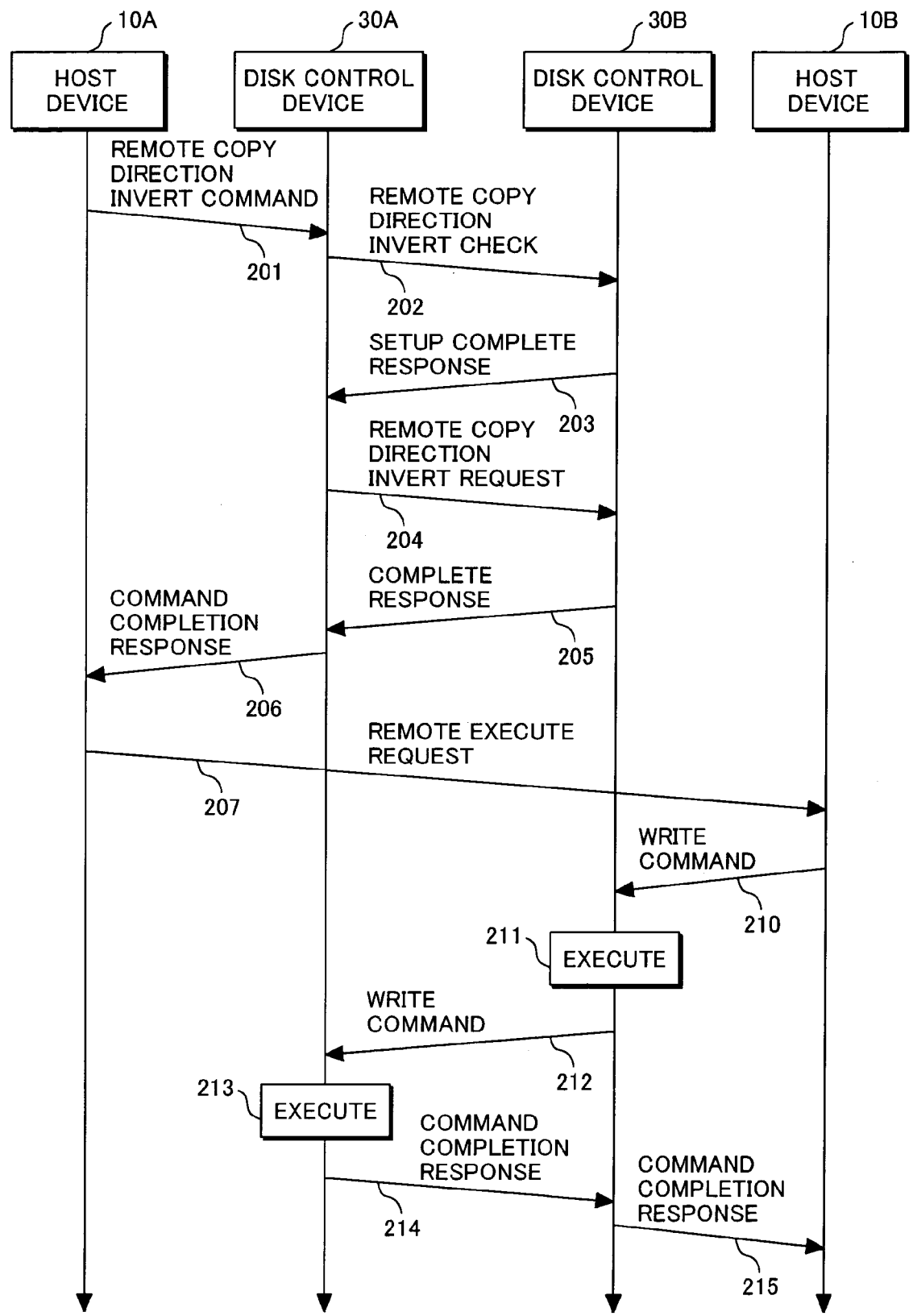
FIG. 3 is a sequence diagram showing one example of the control procedure for remote copy direction inversion in the present invention.

FIG. 3 shows one example of the control procedure for remote copy direction inversion among the host device 10A, disk control device 30A, host device 10B and disk control device 30B, prior to remote operation of the database application 11B.

The host device 10A first of all issues a remote copy direction invert command to the disk control device 30A (201). This remote copy direction invert command is a control command for switching the remote copy direction of database update (or rewrite) results between the disk control devices 30A and 30B and is a unique feature of the present embodiment.

The disk control device 30A that received the remote copy direction invert command issues a remote copy direction invert check request command is to the disk control device 30B (202). This command inquires if the remote copy direction invert command next issued by the disk control device 30 was accepted or not. The remote copy direction still has not been inverted at the point in time the remote disk control device 30B received that command. This (delay) prevents unforeseen data conflicts from occurring due to the specified disk control device not accepting the remote copy direction invert command when, for example, performing remote copy on multiple disk control devices.

The remote disk control device 30B, that received the remote copy direction invert check request command, checks whether the remote copy direction invert request can be received or not. If this command can be received, an invert setup OK response (approval) is sent to the disk control device 30A in reply (203).

When the disk control device 30A receives the (remote copy) invert setup OK response, it issues a remote copy direction invert request to the remote disk control device 30B (204) and then sets copy direction switching on its own device. When the remote disk control device 30B receives the remote copy direction invert request, it switches the database copy direction and then notifies the disk control device 30A with a (remote copy) invert setup OK response (205).

When the disk control device 30A receives the (remote copy) invert setup OK response, it notifies the host device 10A by sending a command completion response (206). The host device 10A stands by to receive the completion response to the remote copy direction invert command, and it sends a database application remote execution request to the remote host device 10B (207).

The remote host device 10B, that received the remote execution request, runs the database application program. When a data write command is issued to the disk control device 30B (210), the disk control device 30B executes that write command and writes the data in the disk device 50B connected to the disk control device 30B (211). The disk control device 30B at this time sends a data write command to the disk control device 30A for remote copying (212).

When the disk control device 30A executes the write command (213) and finishes writing data in the disk device 50A, it sends a write command 212 completion response (2140 to the disk control device 30B. The disk control device 30B waits to receive the completion response 214 from the disk control device 30A, and it sends back a write command 210 completion response to the host device 10B.

When the remote copy direction has been inverted in the above-described control procedure, the host device 10B starts remotely running (executing) the database application. When the host device 10B runs the database application, the disk control device 30B updates (or rewrites) the contents of the database DB. The updated (rewritten) results are therefore copied onto the disk device 50A connected to the host device 50A so that the data on the disk devices 50A and 50B are synchronized (have same data) with each other during remote running of the application.

In the above-described control procedure, the disk control device 30A sends the remote copy direction invert check request command (first phase). The remote disk control device 30B checks if the remote copy direction invert command can be executed. Since the remote copy direction inversion command is being sent (second phase), the remote disk control device 30B can then guarantee that the data saved on all disks for storing copies is identical, even when the disk control device 30A is performing remote copy among multiple remote disk control devices.

Figure 4:
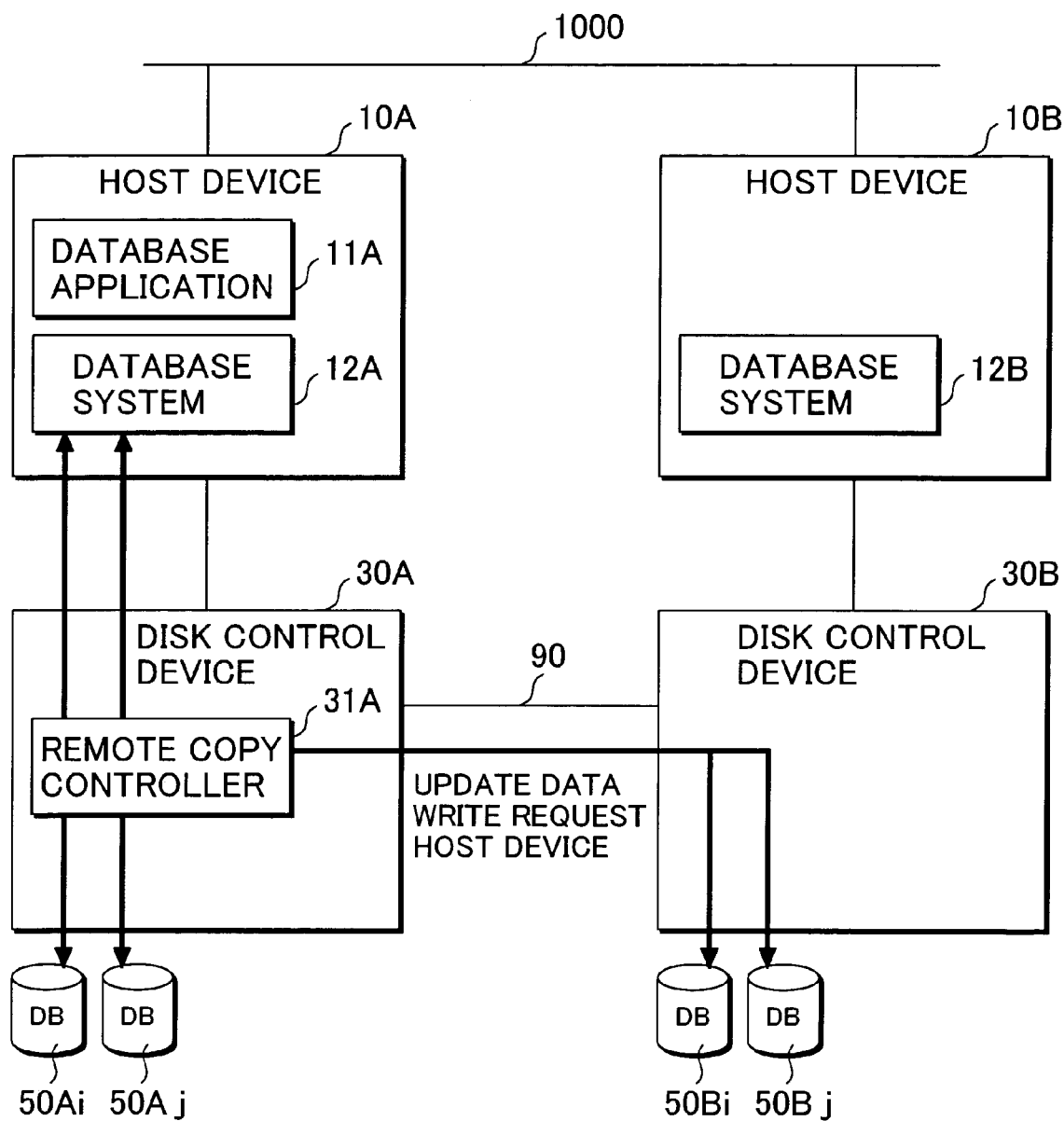
FIG. 4 is a block illustrating data synchronization when executing an application on the host device 10A side in the computer network of FIG. 2.

FIG. 4 is a diagram showing the synchronizing of data among disks when running database application 11A on the host device 10A side using the database system 12A.

When the database application 11A has updated (rewritten) the contents of the database 50Ai, 50Aj, the remote copy controller 31 inside the disk controller device 30A sends a request by dedicated channel 90 to the remote disk controller 30B to write the updated data. The disk control device 30B writes the updated data into the database disks 50Bi and 50Bj. The contents of the remote disks 50Bi, 50Bj can therefore be changed in synchronization with the updated contents of the disks 50Bi and 50Bj. The database system 12B is operating at this time on the host device 10B side. However its database application is not being run, so that the database disks 50Bi and 50Bj are not updated (rewritten) by the host device 10B.

Figure 5:
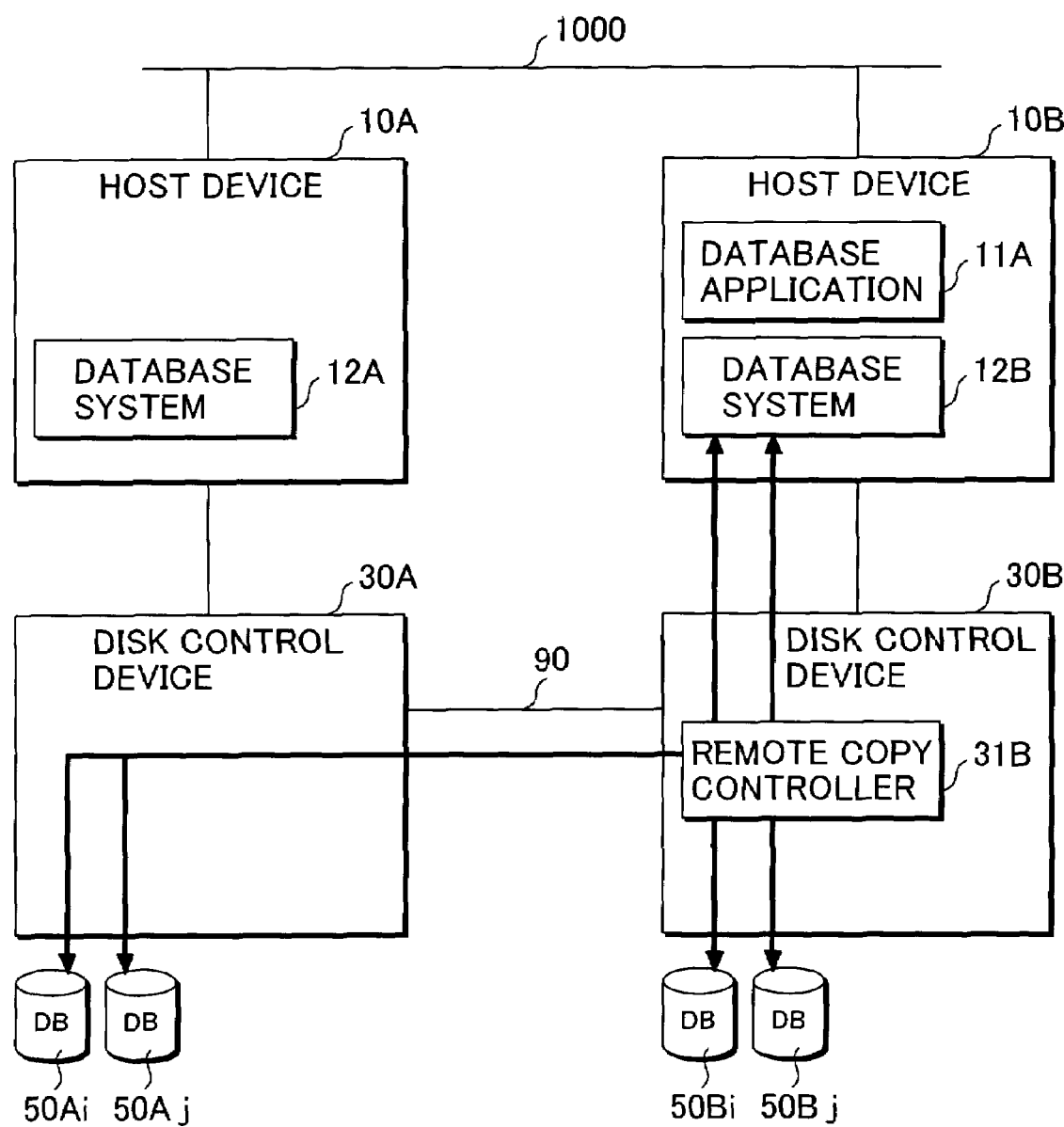
FIG. 5 is a block diagram illustrating data synchronization when executing an application on the host device 10B side in the computer network of FIG. 2.

FIG. 5 is a diagram showing the data synchronization as described in connection with FIG. 3. The data synchronization is shown here between the disk control device 30A on the host device 10A side and the disk control device 30B on the remote host device 10B side when executing the control procedure for remote copy direction inversion. This control procedure is performed in reply to the remote execution request (207), and the remote host device 10B running the database application 11A.

When there is no database application to be remotely run in the remote host device 10B, that database application is sent to the host device 10B from the host device 10A and then the remote execution request (207) is issued.

After the host device 10A has requested the host device 10B to run the database application 11A, the database system 12A is basically in a closed state. The host device 10A therefore can utilize the local host for database access.

When the host device 10B receives the request from the host device 10A to run the database application 11A, it uses the database 12B to run the database application 11A, update (rewrite) the disk 50Bi, 50Bj data or start disk retrieval.

When the disk control device 30B rewrites the contents of the database disks 50Bi, 50Bj as a result of the control procedure described in connection with FIG. 3 for inverting the remote copy direction, the remote copy controller 31B sends a request by dedicated channel 90 to the disk control device 30A to write the updated data. The disk control device 30A rewrites (updates) the contents of disks 50Ai, 50Aj in synchronization with the disks 50Bi and 50Bj. Therefore, the latest data can be held in the database disks 50Ai and 50Aj on the local host device 10A side even when the database application was run on the remote host device 10B.

Figure 6:
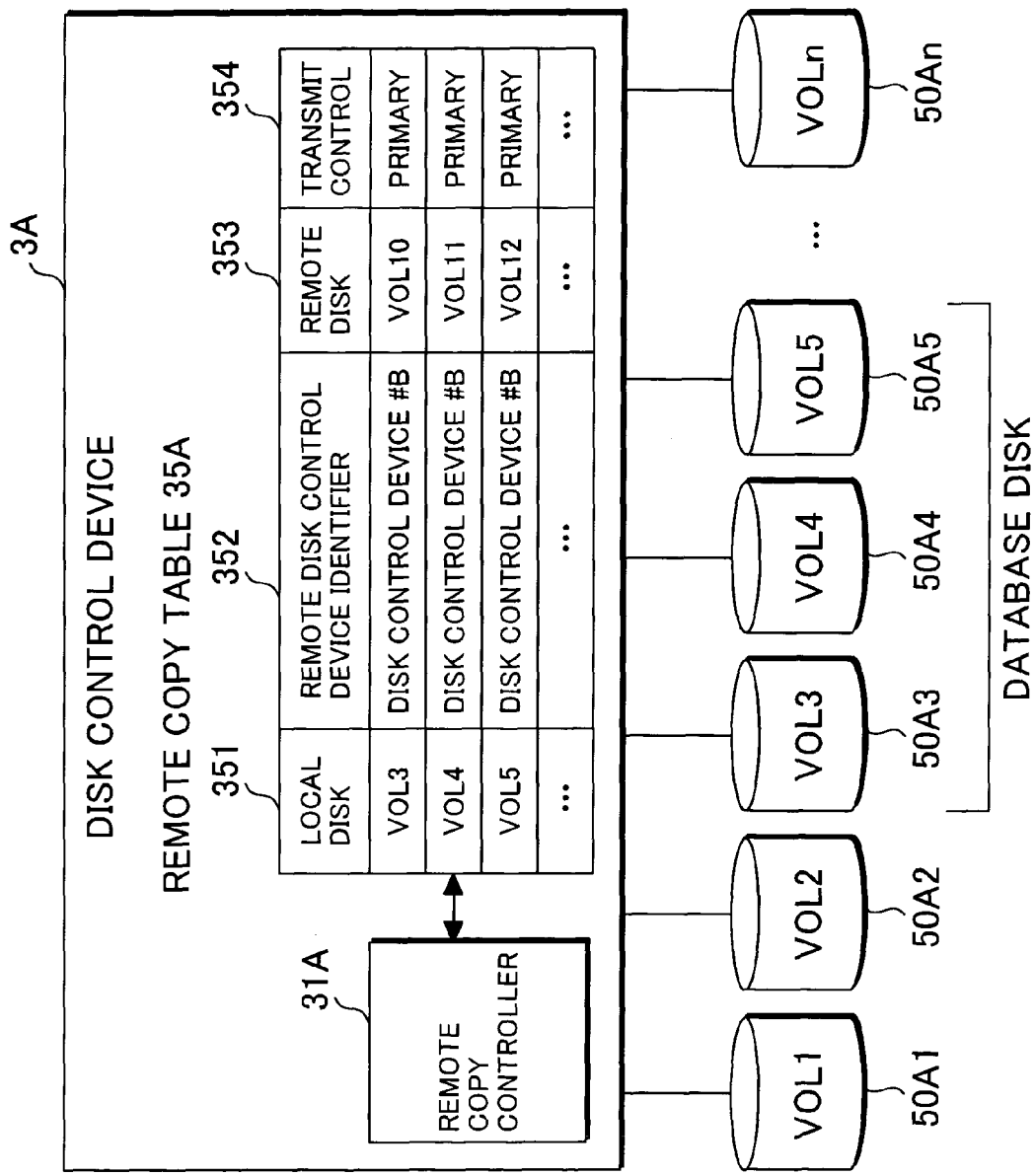
FIG. 6 is a diagram showing one example of the remote copy table 35A.

FIG. 6 shows the contents of the remote copy table 35A contained in the disk control device 30A and the relation with the local disks 50A1 through 50A5 connected to that disk control device.

The remote copy table 35A is made up of multiple entries for the local disk identifier 351 connected to the disk control device 30A. The remote copy controller 31a controls the remote copying according to the contents in the entries registered in the remote copy table 35A.

Entries shown on the remote copy table 35A are the local disk identifier 351 and the corresponding remote disk control device identifier 352, and remote disk identifier 353 and the command transmit control information 354.

The remote disk identifier 353 indicates the remote disk that is the copy destination (or copy source) for the disk contents holding the remote disk identifier 351. The remote disk control device identifier 352 indicates the identifier for other disk control devices connected to the remote disk. In the present embodiment, the command transmit control information 354 is set with a remote copy control code showing the "primary" or "secondary" for determining the remote copy direction.

When the control code 354 has been set to primary, for example, the remote copy controller 31A of the disk control device 30A is the primary and the remote copy controller on the remote disk control device side is the secondary. Remote copy is here performed from the control device itself (local disk) towards the remote disk control device (remote disk). Conversely, when the control code 354 has been set to secondary, remote copying is performed from the remote disk towards the local disk. Data writing from the host device is prohibited on local disks where the control code is set to secondary and the stored data is updated only by copying from the remote disk control device. Multiple disks 50A1 through 50An are connected to the disk control device 30A. Different remote copy directions can be specified for each disk among multiple disks stored in the same disk control device, by specifying a control code 354 corresponding to the local disk identifier on the remote copy table 354. A desired disk can be specified for remote copying. For example, a particular disk from among the local disk group can be registered on the remote copy table 35A as, for example, 50A3 (VOL3) through 50A5 (VOL5) among the database disks.

The remote disk control device (for example, disk control device 30B) also contains a remote copy table 35B as described above. However, on the table entries on the remote disk control device side, the codes set in command transmit control information 354 for the remote copy target are the reverse of the codes set for the remote copy table 35A on the above described disk control device 30A.

The disk control device 30A accesses the disks 50A1 through 50An without recognizing the type of application constituting the request source for disk access. For example, even if the disks 50A3 through 50A5 constitute the database, the disk control device 30A controls the access to these disks in the same manner as the other disks (50A1, 50A2, . . . ).

One characteristic of the present embodiment is that the host device 10A (10B) informs the disk control device 30A (30B) of the disks used by the database system 12A (12B). When running an application on a remote disk device, the disk needing the application only knows that application. Therefore, when executing the application on a remote disk device, the host device 10A specifies to the disk control device 30A on what disk the remote copy direction should be inverted.

Figure 7:
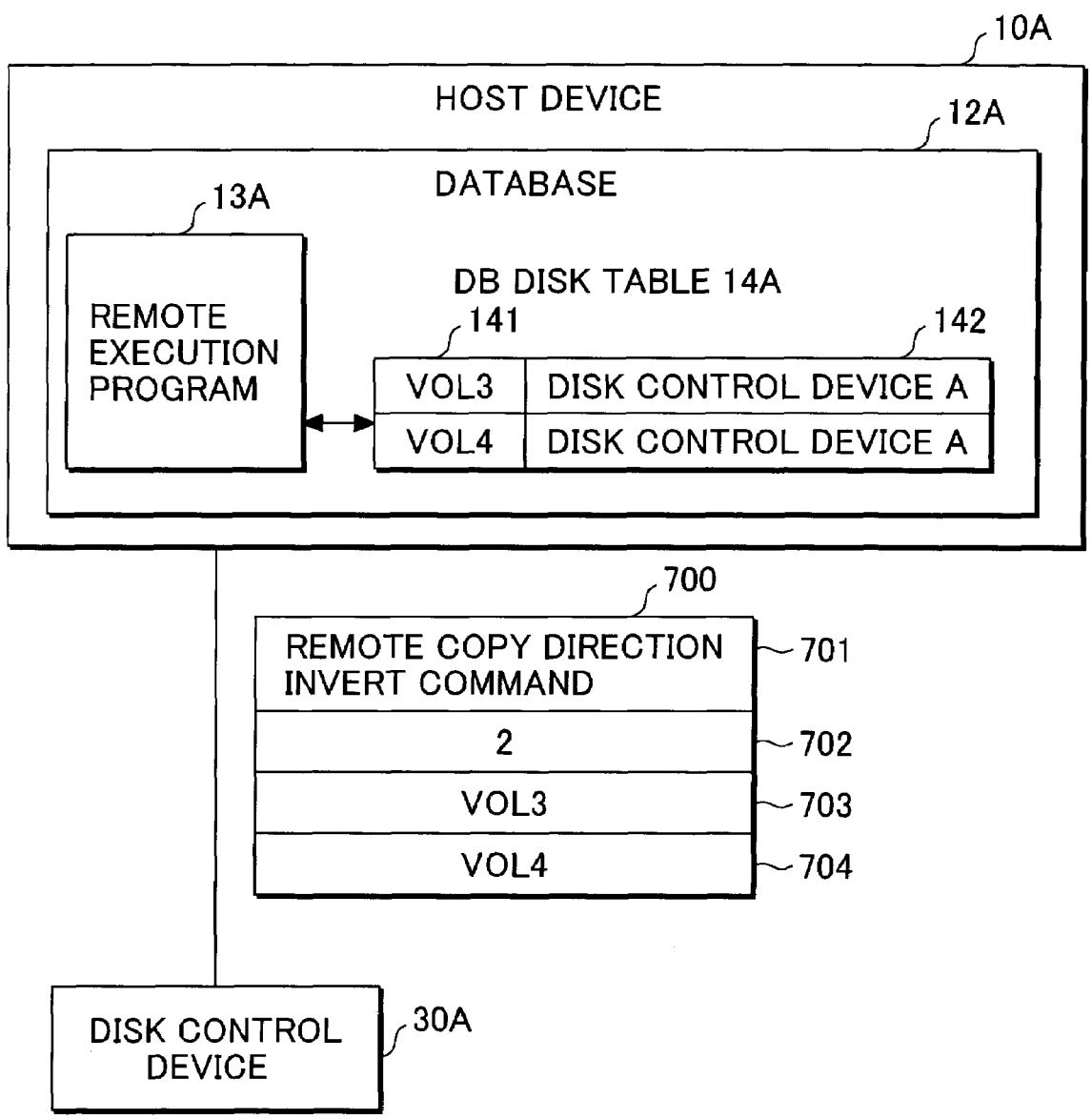
FIG. 7 is a block diagram showing the contents of the DB disk table 14A contained in the host device 10A and also showing one example of the copy direction invert command 700.

FIG. 7 shows the database (DB) disk table 14A contained in the host device 10A, and it also shows one example of the copy direction invert command 700 issued from the host device 10A to the disk control device 30A.

The database system 12A is composed of a remote control program 13A and a DB disk table 14A. The remote control program 13A requests the remote host device (for example 10B) to run the application and when necessary sends the application program itself that must be run. The DB disk table 14A is stored with a list of entries showing the relation between the identifier 141 of the disk used by the database application and the identifier 142 of the disk control device connected to that disk.

Prior to sending the application to the remote host device or requesting the running (execution) of the application, the remote control program 13A issues the copy direction invert command 700 to the disk control device 30A connected to the host device 10A. This command 700 contains a command field 701 set with a command showing the remote copy direction inversion, followed by a number of disks 702 for remote copy direction inversion, and identifiers 703, 704 of disks for remote copy direction inversion. Multiple disk identifiers whose copy direction is to be inverted can be specified at the same time.

When multiple disk control devices are connected to the host device 10A and disks needed to run a database application are dispersed among these multiple disk devices, the remote copy direction invert command 700 is issued to each of these disk control devices. The disk control device 10A executes the remote copy direction inversion procedures 202 through 205 of FIG. 3, among the remote disk control devices, in response to this command 700.

Figure 8:
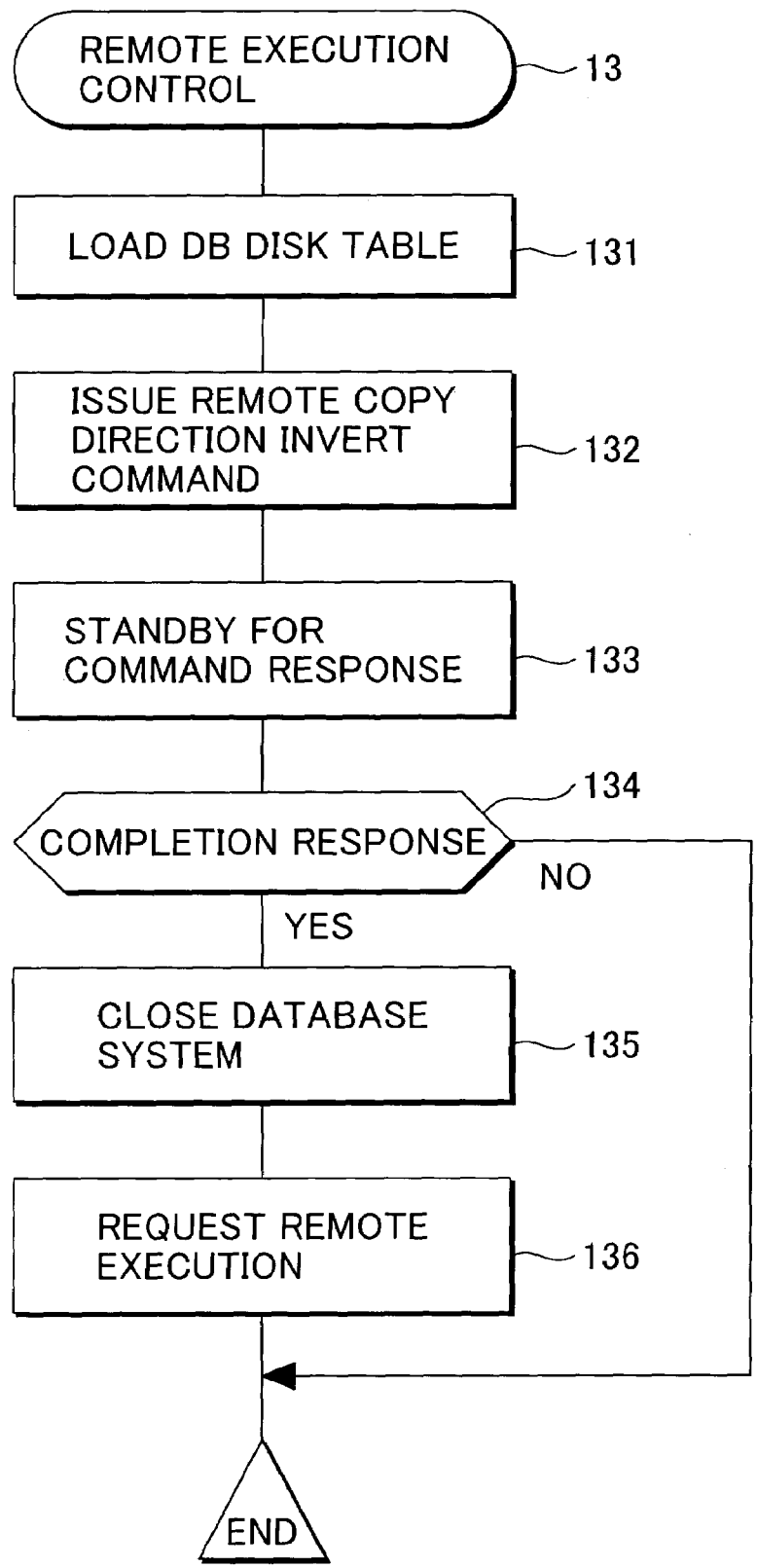
FIG. 8 is a flow chart showing the remote control program executed by the host devices 10A and 10B.

FIG. 8 is a flow chart showing the remote control program 13 that is executed by the host devices 10A (10B).

The host device 10A acquires from the DB disk table 14A (14B) the list specifying the disks for copy direction inversion (step 131). The host device 10A then issues the remote copy direction invert command 700 shown in FIG. 7 to the disk control device 30A specified in the list (132) and then awaits a reply from the disk control device in response to this command (133). When this command 700 is received, and the disk control device 30A has executed the remote copy direction inversion procedures 202 through 205 of FIG. 3, it sends back the command completion response 206 to the host device 10A. When executing a command that has ended in a failure, the disk control device 30A sends back an error response.

When the command response from the disk control device 30A is received, the host device 10A decides whether or not the received response is the command complete response (134). When the response that was received is an error response, the execution of that program is terminated. When the response is a completion response, then the database system 12A is closed (135), and a request for remote execution is made to the remote host device (136), and the execution of that program is terminated. Sealing the database system prevents simultaneous execution of database applications by the device itself and the remote host device and makes it possible to keep the data in a consistent format.

Figure 9:
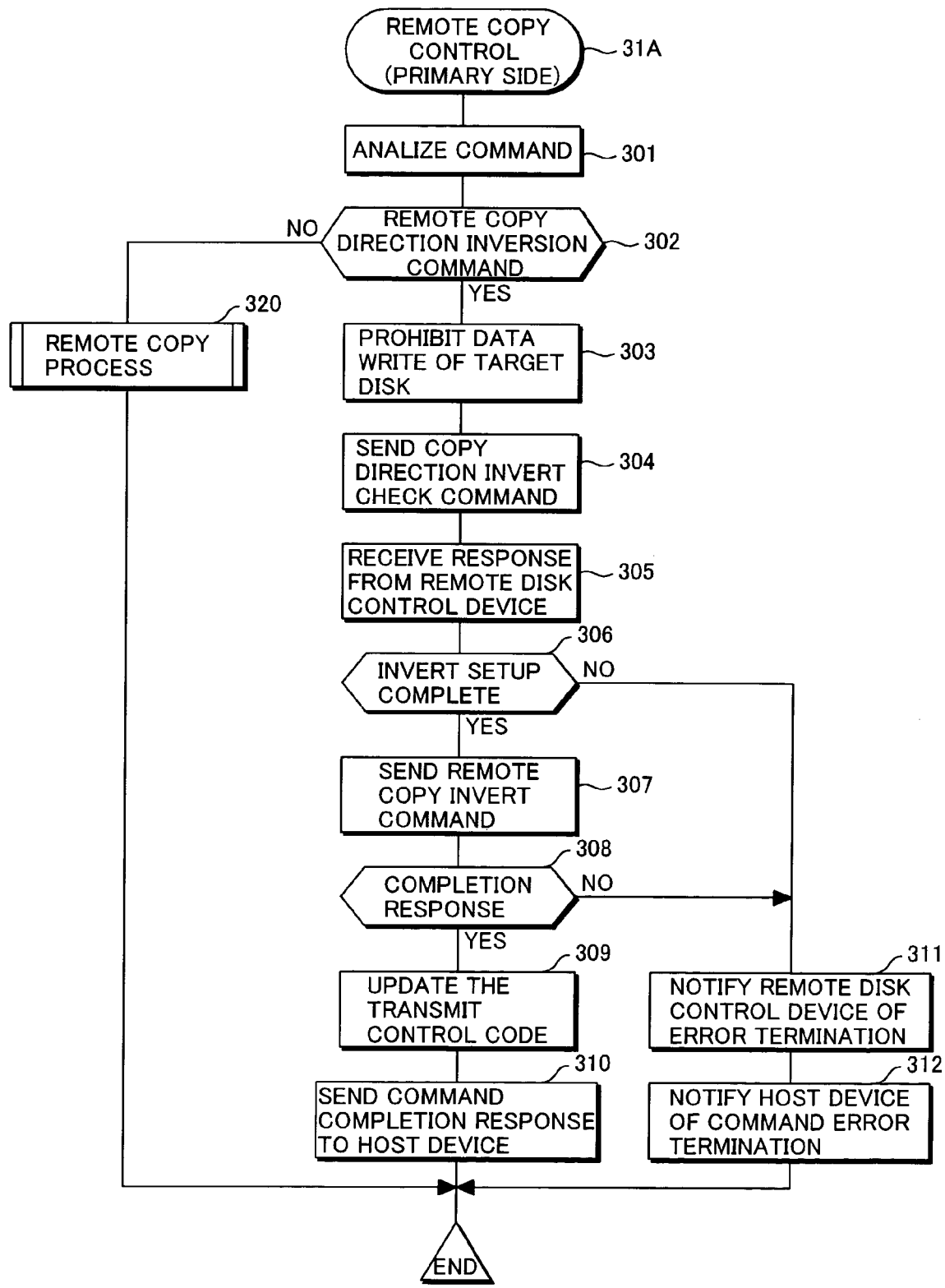
FIG. 9 is a flow chart showing the remote copy control executed by the disk control device specified in the primary.

FIG. 9 is a flow chart showing the remote copy controller (remote copy control routine) in the disk control device (here as disk control device 30A) specified in control information 354 as the primary.

The command that the remote control command 31A receives from the host device 10A is effective in the case of the remote copy direction invert command 700 or a data write command to the disk targeted for remote copying.

Figure 10:
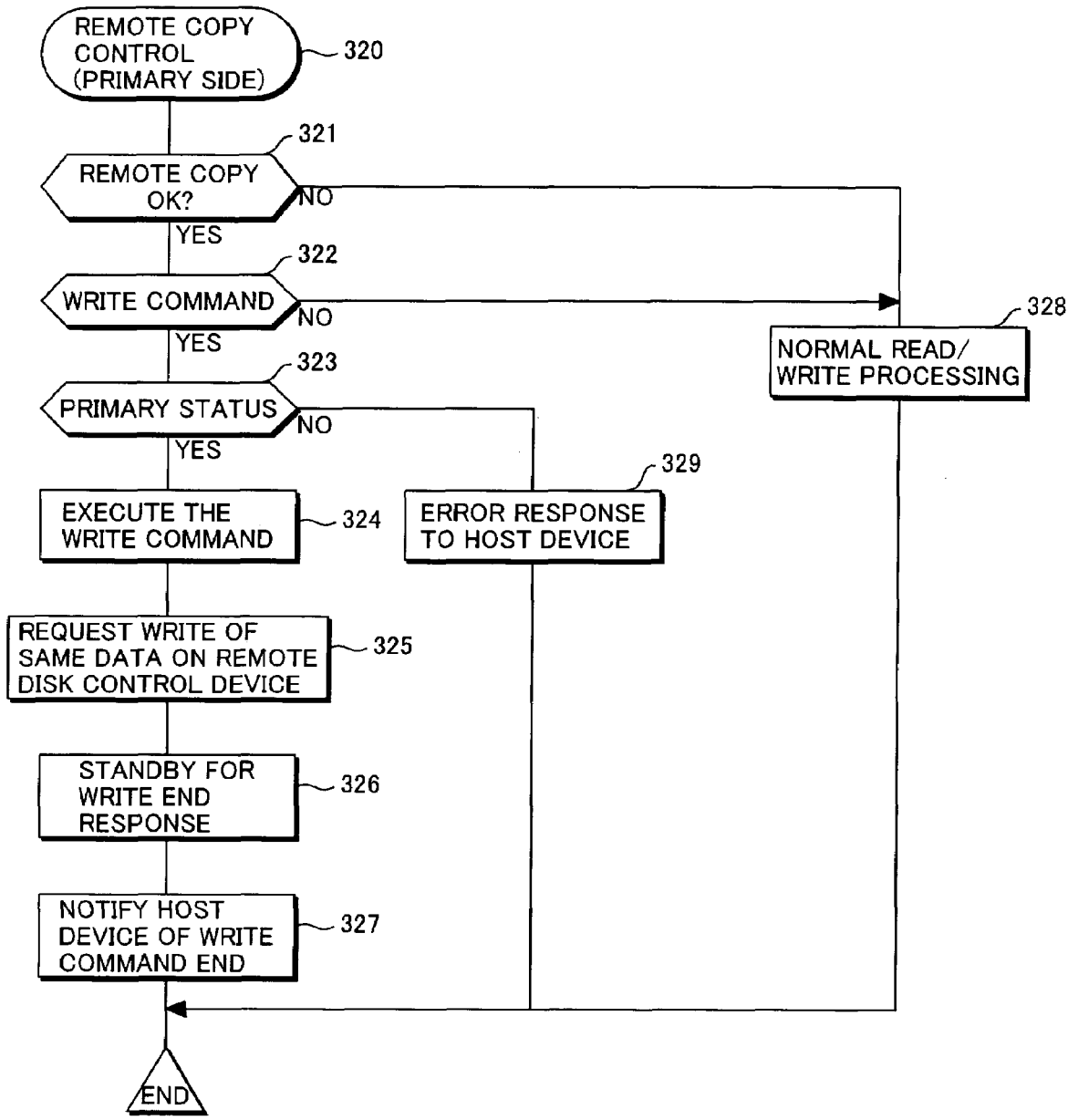
FIG. 10 is a flow chart showing in detail the remote copy process 320 of FIG. 9.

The primary disk control device 30A analyzes (step 301) the command received from the host device 10A and decides if the received command is a remote copy direction invert command or not (302). If the received command is not a remote copy direction invert command, then the remote copy processing 320, to be described later with reference to FIG. 10, is executed.

When the received command is the remote copy direction invert command, the primary disk control device 30A is prohibited by host device 10A from updating (rewriting) data (303) on the disks for remote copy (VOL3, VOL4 in the example in FIG. 7) shown by the received command. This prohibition on data updating (rewrite) is intended to keep the data consistent. The primary disk control device 30A then designates, from the remote copy table 35A, an identifier on the remote disk control device that corresponds to the disk to be copied. The primary disk control device 30A then sends a remote copy direction invert check command to the applicable remote disk control device by way of the channel 90 (304). When the command received from the host device 10A specifies multiple disks for copying, and there are multiple disk control devices involved in the remote copy, this check command is sent to these multiple remote disk control devices.

When the primary disk control device 30A receives the response to the check command from the remote disk control device by way of the channel 90 (305), that remote disk control device decides, from the contents of the reply, whether or not the inversion setup (preparation) for the remote copy direction is completed or not (306). If the replies are all okay (normal), or, in other words, if the setup for inverting the remote copy direction is complete on all remote disk control devices that received the transmitted check command, then a remote copy direction invert command is sent to the remote disk control device by way of the channel 90 (307).

When the reply to the check command is an error, or, in other words, when any of the remote disk control devices at the transmit destination of that check command cannot set to an inversion state, all remote disk control devices receiving the check command are notified of error termination (311) (discontinuing remote copy direction inversion) and the error termination of the remote copy direction inversion is reported to the host device 10A (312) and the routine then ends. In this case, the prohibition on data updates (rewriting) from the host device 10A for the disk for copying is canceled.

The primary disk control device 30A awaits a reply to the remote copy direction inversion command. The primary disk control device 30A decides whether completion replies were received or not from all the remote disk control devices (308). When a completion response is received from all remote disk control devices, the local disk identifier 351 in the remote copy table changes the control code 354 entries corresponding to the target remote copy disk from primary to secondary (309). The remote copy direction invert command is returned (310) to the host device 10A and this routine then ends.

When an error reply comes back from any of the remote disk control devices in response to the remote copy direction invert command, the primary disk control device 30A executes steps 310, 311 to end this routine. In this case also, the prohibition on data updates placed on the target copy disk by the host device 10A is canceled.

FIG. 10 is a flow chart showing in detail the remote copy process 320.

In the remote copy process 320, a decision is made to determine if the command received from the host device 10A is a command to access the disk for remote copy (321) or not. When the received command is a read command or write command to access a disk other than the target remote copy disk, then the normal read/write process (328) is executed.

When the received command is a command to access the target disk for remote copying, then the type of received command is determined (322). If it is not a write command, then the normal read process is executed in step 328. If the received command is a write command, then the remote copy table 35A is searched, and the control code 354 of the disk for accessing is determined (323).

When the disk to be accessed is in a secondary status, an error response is set to the host device (329) to maintain data consistent with the remote disk, and this routine ends. When the disk that must be accessed is in primary status, then a write command is executed (324) for the target disk for remote copying as specified in the received command. Execution of this write command is the same as the write operation on a normal disk, and it includes writing data in the data cache.

When execution of the write command ends, the disk control device 30A searches the remote copy table 35A. The disk control device 30A designates a remote disk control device matching a target disk for remote copying specified in that table. The disk control device 30A then makes a request to the remote disk control device to write data attached to the write command into the remote disk (325). The disk control device 30A then awaits the completion of data writing by the remote disk control device (326). When a completion response is received from the remote disk control device by way of the channel 90, the completion of the write command is communicated to the host device 19A (327) and this routine ends.

Figure 11:
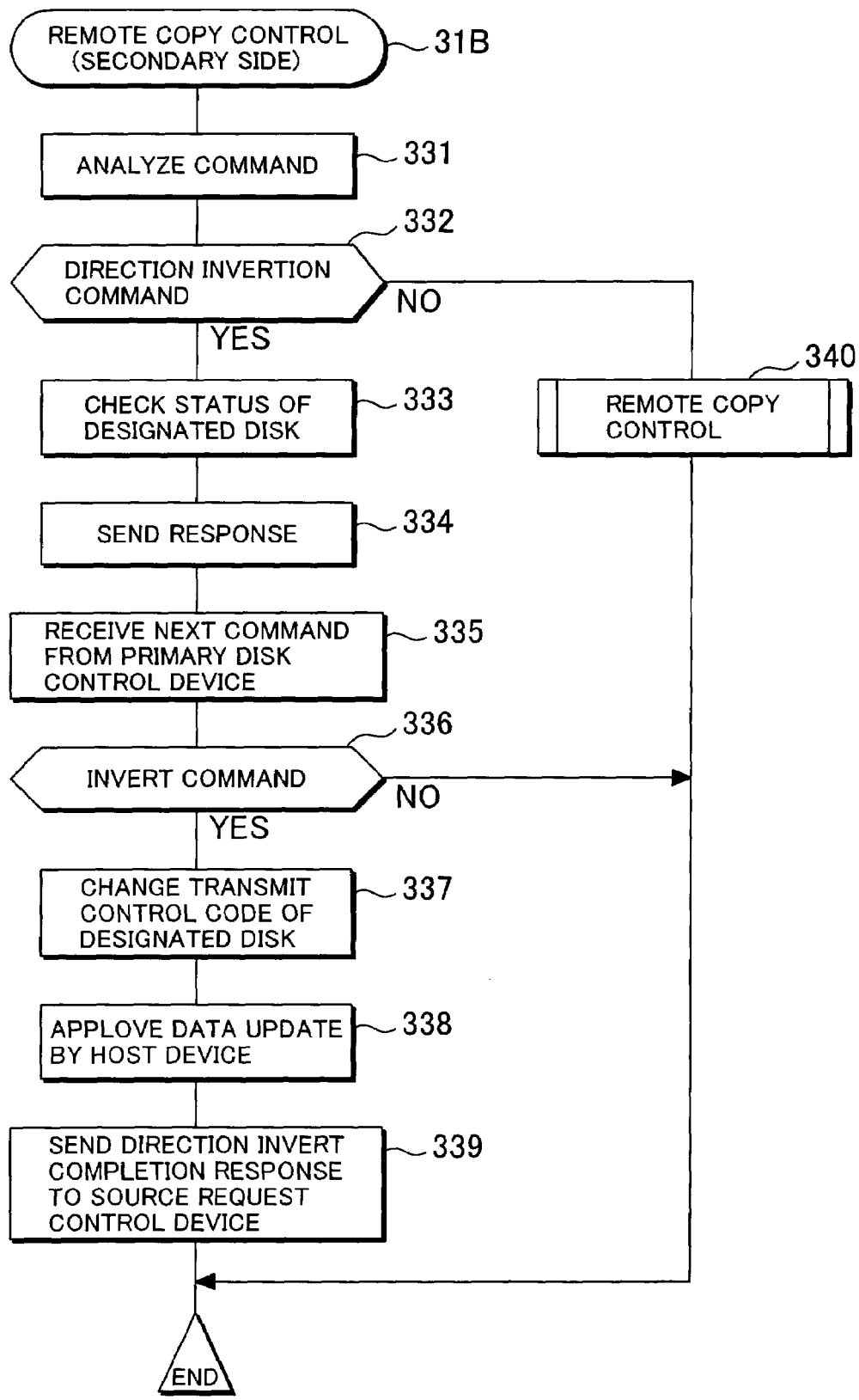
FIG. 11 is a flow chart showing the remote copy control executed by the disk control device specified in the secondary.

FIG. 11 is a flow chart showing the operations of the remote copy controller (remote copy control routine) 31B. This routine is executed when the command is received from the channel 90 by the disk control device (here, disk control device 30B) specified in the secondary in remote copy status 354.

The secondary disk control device 30B analyzes the command received from the primary disk control device 30A by way of the dedicated channel 90 (step 331). The device 30B then decides whether or not the received command is the remote copy direction invert check command (332). If the received command is not the remote copy direction invert check command, then processing goes to the remote copy process 340 to be described later with reference to FIG. 12. However if the received command is the remote copy direction invert check command, then the secondary disk control device 30B confirms the state of the disk specified in the command (333). If the remote copy direction of the specified disk can be inverted, then a remote copy direction invert setup OK response is sent by dedicated channel 90 to the transmit source control device that sent the check command (334). For example, if the remote copy direction of the specified disk cannot be inverted due to a defect on the disk, then the secondary disk control device 30B sends an error response instead of the invert setup OK response.

The secondary disk control device 30B awaits the next command from the primary disk control device 30A (335). When the next command received from the channel 90 is the remote copy direction invert check request (336), the control code 354 of the disk shown by the direction inversion request (or remote copy direction check command) is changed from secondary status to primary status (337). The host device 10B then allows data updates (rewriting) of that disk (338). The secondary disk control device 30B then sends a remote copy direction inversion completion reply to the transmit source disk control device that made the request (339) and this routine then ends.

If the next command that is received in step 335 is not the remote copy direction invert command, and, for example, it is an error termination notice, then steps 337 through 339 are executed and this routine then ends.

Figure 12:
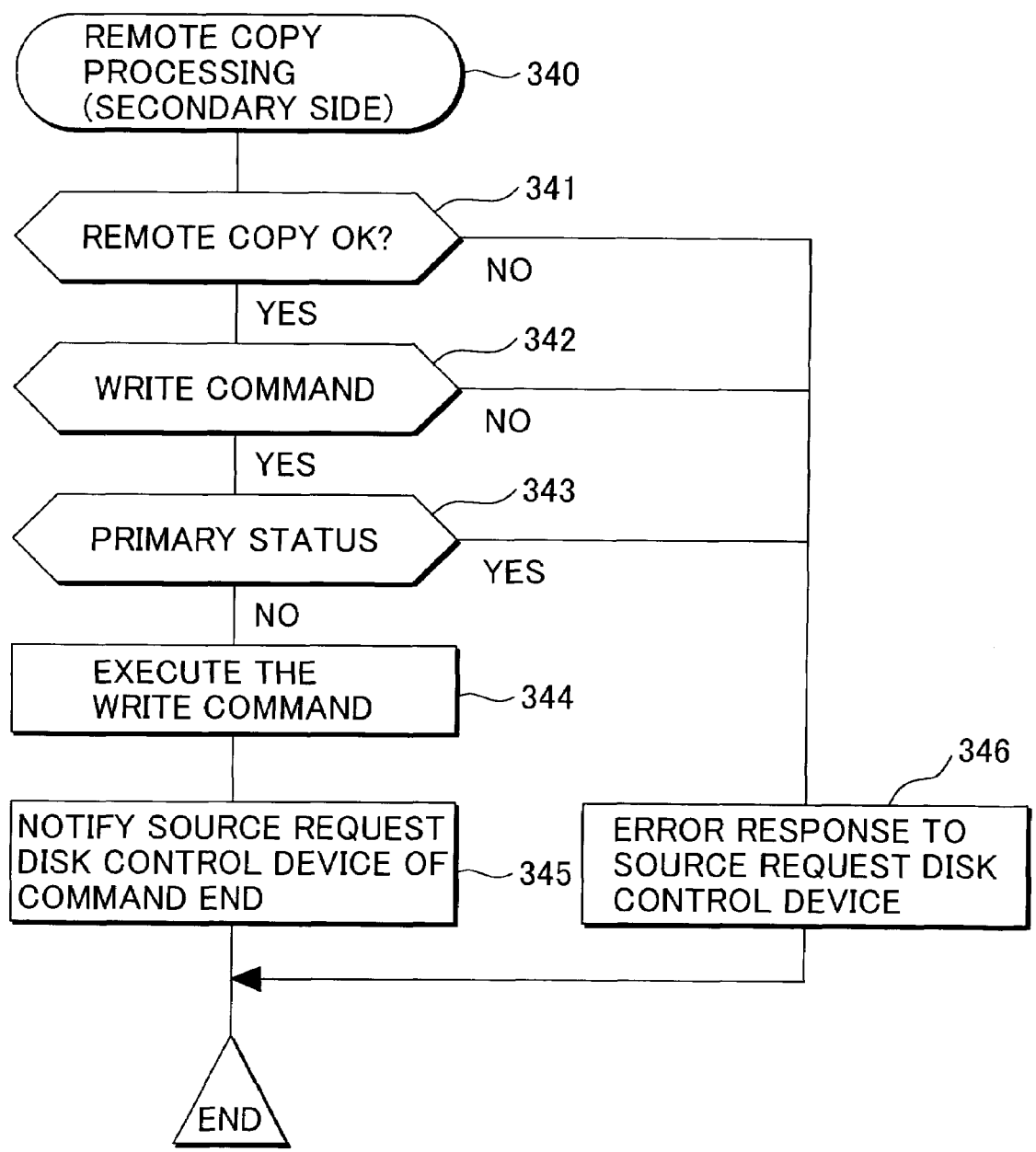
FIG. 12 is a flow chart showing in detail the remote copy process 340 of FIG. 11.

FIG. 12 is a flow chart showing in detail the remote copy process 340.

In the remote copy process 340, the secondary disk control device 30B decides whether or not the command received from the channel 90 is a write command for writing data on the target remote copy disk (341, 342). If the received command is not the write command for writing on the remote copy disk, then an error reply is sent (346) to the primary disk control device (disk control device 30A), and this routine is ended.

When the received command is a write command for writing data on the target remote copy disk, then the control code 354 on the remote copy table 35B for the disk to be accessed is determined (343). The secondary disk control device 30B confirms that the disk to be accessed is in the secondary state and then executes the write command (344). The ending of the write command is communicated (354) to the primary disk control device and this routine is ended. In step 342 when the disk to be accessed has been set to the primary state, an error reply is sent to the primary disk control device (346) because the write command received from channel 90 conflicts with the contents defined on the remote copy table 35B, and this routine is then ended.

The host device prohibits data updating (rewriting) on disks specified as secondary for remote copy. However in the present embodiment, the remote copy directions among the disk control devices can be switched. In other words, the relation between primary disks and secondary disks can be actively switched by using the above described remote copy control function contained in each disk device. Thus, in the present embodiment, after a host device has switched the direction of remote copy, by requesting a host device to remotely run an application, the contents of the disks on either of the two host devices linked with each other can be updated (rewritten). Further, the contents of the disks used by these host devices can be changed in mutual synchronization with each other.

Figure 13:
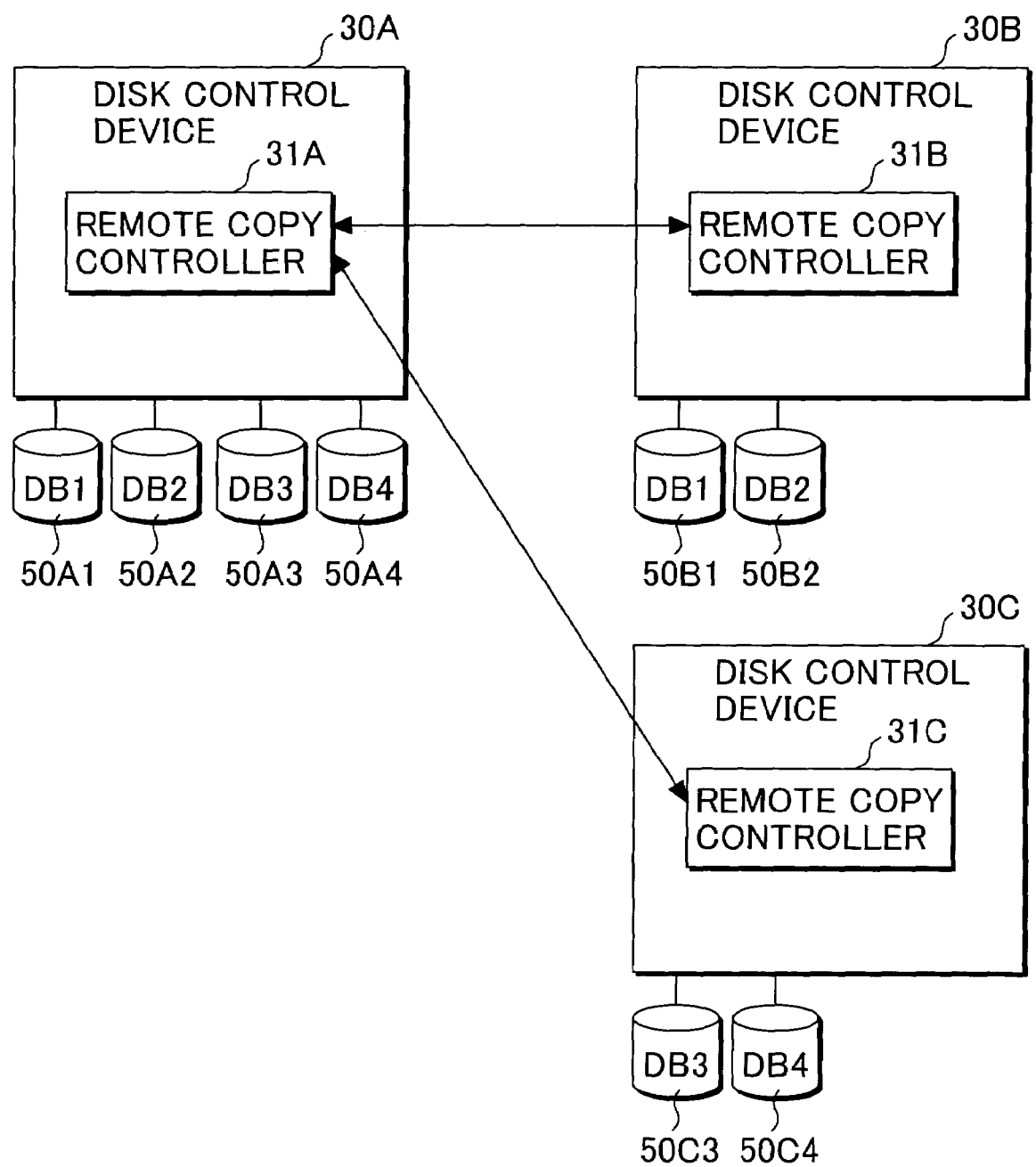
FIG. 13 is a diagram illustrating a variation of the first embodiment.

FIG. 13 shows a variation of the first embodiment.

In this example, the copy data of the multiple remote disk control devices 50A1 through 50A4 (DB1 through DB4) contained in the disk control device 30A are held while being dispersed among multiple remote disk control devices 30B, 30C. The disks 50B1 (DB1), 50B2 (DB2) for holding copy data of disks 50A1 (DB1), 50A1 (DB2), are connected to the remote control disk device 30B. The disks 50C3 (DB3), 50C4 (DB4) for holding copy data of disks 50A3 (DB3), 50A4, (DB4) are connected to the remote disk control device 30C.

Utilizing the remote copy control functions described in connection with FIG. 9 and FIG. 11 makes it possible to make remote database copies even among multiple disk control devices and one disk control device 30A. The disk control device 30A can also make requests to other multiple control devices to remotely run an application.

In the related art, where large scale data such as databases were sent in one batch, too much time was required for copying data onto other disks, so it was difficult to remotely run applications from a remote host device using copied data. However, as shown by the first embodiment, the time required to copy data can be shortened by using the remote copy control of the present invention with the remote copy direction invert function. The data required to run an application such as a database can therefore be shared between the remote host device and a local host device. Applications requiring data on a large scale can also be easily run remotely. In the present embodiment, a dedicated channel was connected among the disk control devices. However, a network for example can be utilized to connect the host device instead of the dedicated channel.

A disk control device containing a virtual disk mechanism will be described next as a second embodiment of the present invention. The disk control device of the second embodiment is capable of sharing data among a host device not possessing a disk device and a remote host device containing a disk device.

Figure 14:
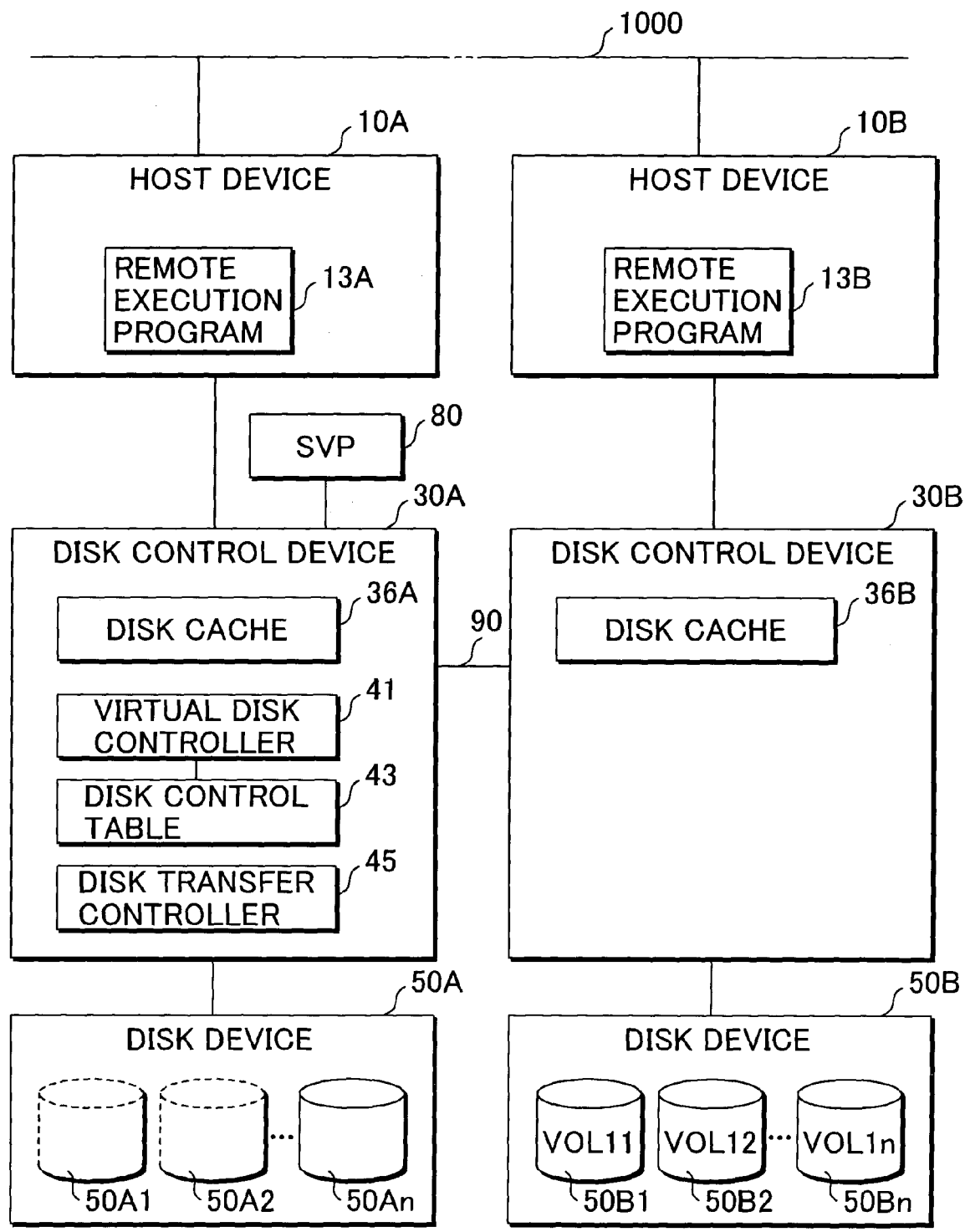
FIG. 14 a system structural block diagram of the second embodiment of the present invention.

FIG. 14 is a diagram showing the basic system structure of the computer network of the second embodiment. Components identical to those of the first embodiment have the same reference numerals. The host devices 10A and 10B respectively contain the remote execution programs 13A and 13B. The disk control device 30A connected to the host device 10A is composed of a disk cache 36A to temporarily store the read/write data from the host device, a virtual disk controller 41, a disk control table 43, and a disk transfer controller 45. The virtual disk controller 41 and disk transfer controller 45 are achieved by software (program routine) run by the processor or the disk controller device 30A.

In the present embodiment, the disk control device 30A controls a portion of the disk. Here that portion for example is constituted by the virtual disks 50A1 through 50A4. The virtual disk itself is in the disk device 50B connected to the remote disk control device 30B. The disk control device 30A need not possess any structure containing a local disk. However, a disk control device 30B with an internal disk cache 36 is connected to the host device 10B. A disk device 50B (disks 50B1 through 50Bn) is connected to the disk control device 30B.

When the virtual disk controller 41 receives requests from the host device 10A for read/write on a virtual disk that is not actually connected to the disk control device 30A, the virtual disk controller 41 utilizes a function to send these requests to the remote disk control device 30B by way of the dedicated channel 90. The disk control device 30A utilizes the virtual disk controller 41 to perform as if a disk was actually present in the host device 10A even though the virtual disk is not actually connected. The virtual disk makes it possible to run the read/write application.

The disk transfer controller 45 is started up by a disk transfer command from the SVP80. The contents of the local disk specified by the disk transfer command are copied in blocks onto the specified disk on the remote disk device 50B side.

Figure 15:
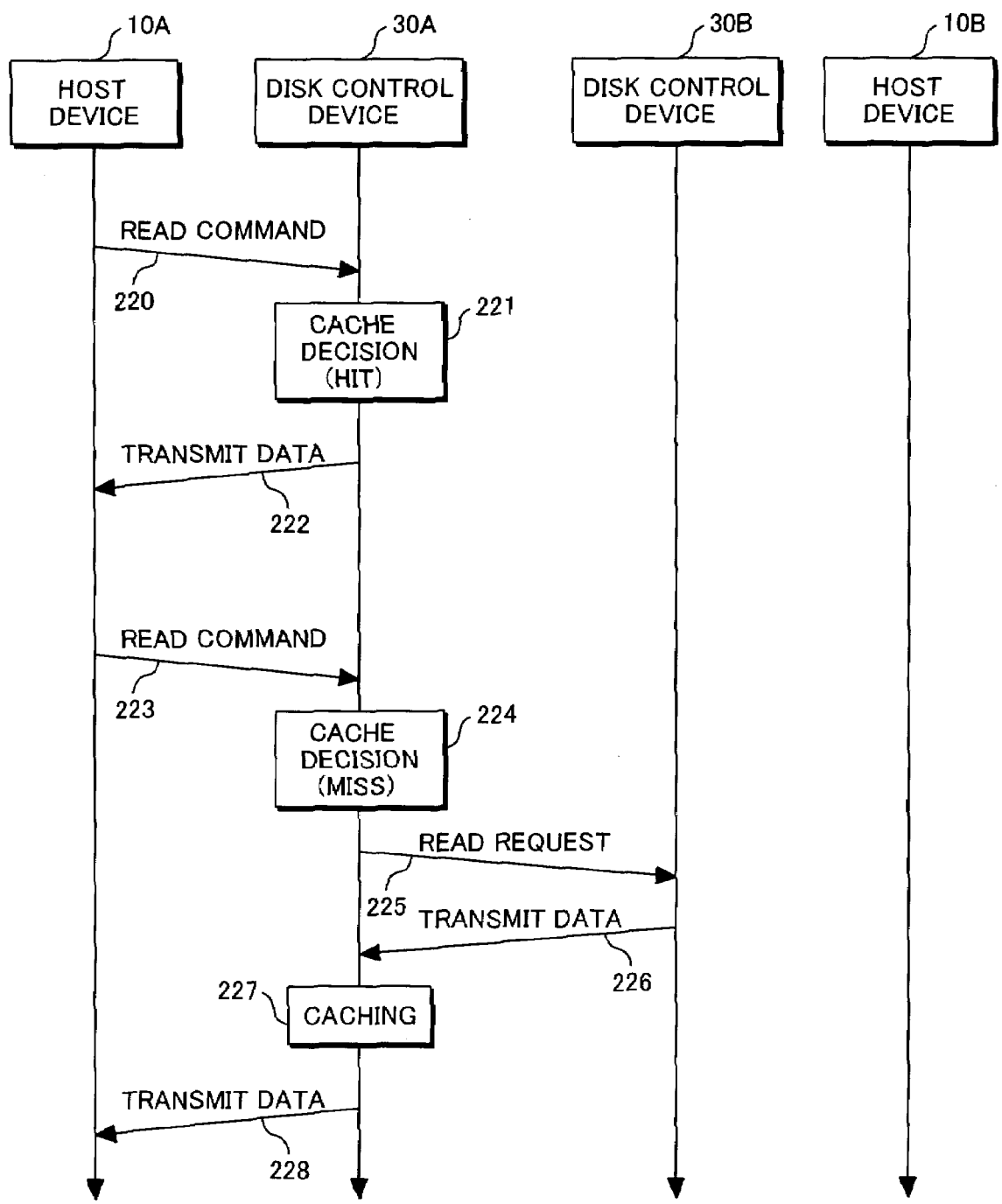
FIG. 15 is a sequence diagram showing the operation when the host device 10A has sent a read command in the second embodiment.

FIG. 15 is a sequence diagram showing the operation when the host device 10A has sent a read command for a virtual disk to the disk control device 30A in the second embodiment.

The steps 220 through 222 are the sequence which is carried out when the target data is present in the disk cache 36A. When the disk control device 30A receives the read command (220), it makes a hit decision (221) on whether the target data is in the disk cache 36A or not. The disk control device 30A sends the loaded target data from the disk cache 36A to the host device 10A (222).

Steps 223 through 228 show the sequence that is carried out when the target data is not present in the disk cache 36A. When the disk control device 30A receives the read command (222), it makes a hit decision (224) on whether the target data is in the disk cache 36A or not. When it is determined that the target data is not in the disk cache 36A, the disk control device 30A issues a read request for the target data to the remote disk control device 10B (225). When the disk control device 30A receives the target data from the remote disk control device 10B (226), it stores this target data in the disk cache 36A (227) and afterwards sends it to the host device 10A (228).

Figure 16:
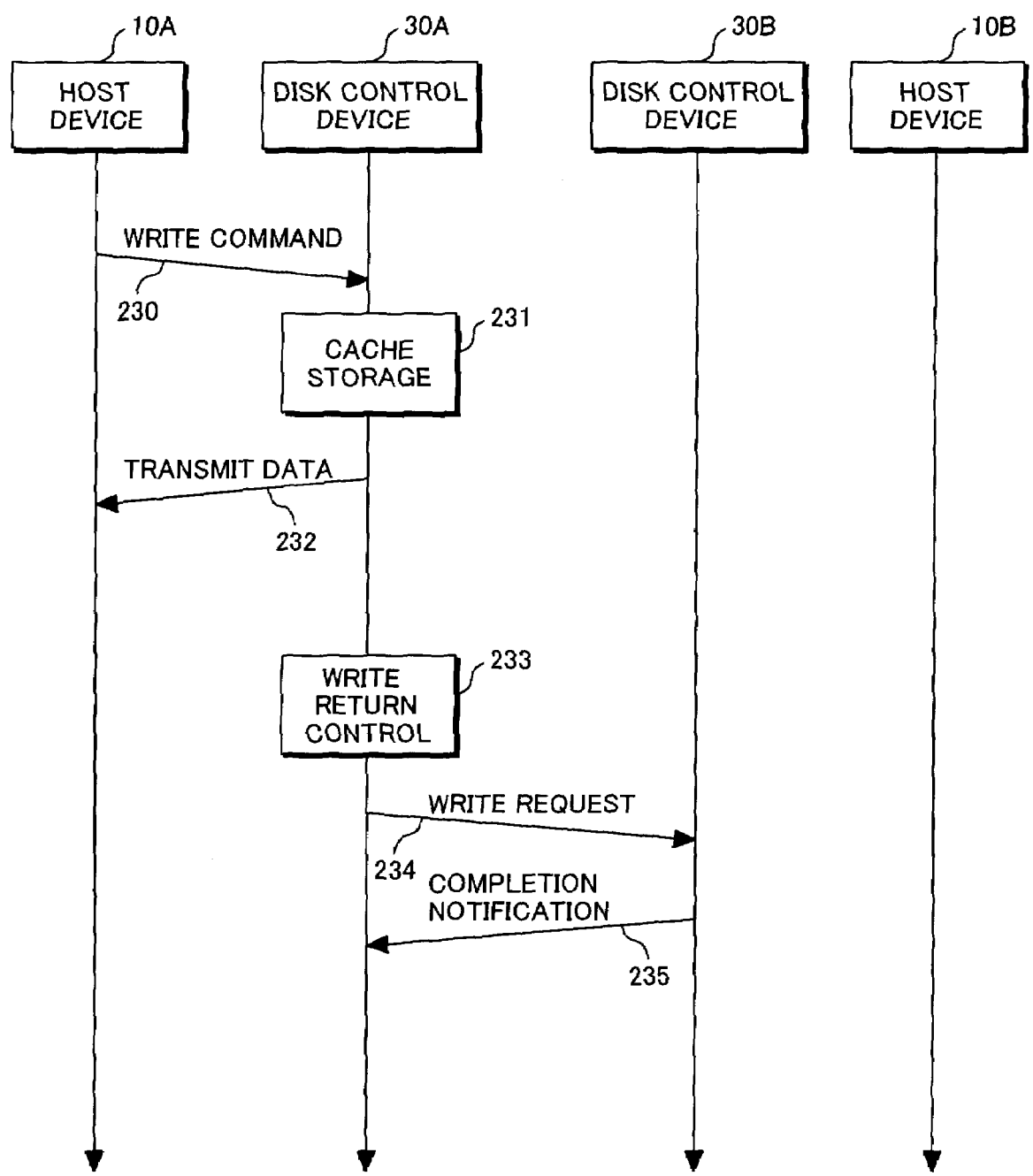
FIG. 16 is a sequence diagram showing the operation when the host device 10A has sent a write command in the second embodiment.

FIG. 16 is a sequence diagram showing the operation when the host device 10A has issued a write command to the disk control device 30A for writing on the virtual disk in the second embodiment.

When the disk control device 30A receives the write command from the host device 10A (130), it stores the write data appended to the write command into the disk cache 36A (231) and afterwards sends back notification to the host device 10A that the write command is completed (232).

The disk cache usually has a battery backup, so that even if a power outage occurs, the stored data is not lost. However the stored data must still be transferred periodically to disk devices. Therefore, in this embodiment, the disk control device 30A periodically executes write-back control (233) and issues a write request for data stored in the disk cache to the remote disk control device 30B. The disk control device 30A then receives a notification from the remote disk control device 30B that writing on the remote disk is completed (235).

The remote disk control device 30B temporarily stores the write request data from the disk control device 30A in the disk cache 36B, the same as for the write data from the host device 10B. The data may be written in the disk device 50B; and, if it is write request data from the disk control device 30A, it may be promptly written in the disk device 50B without being stored in the disk cache.

Figure 17:
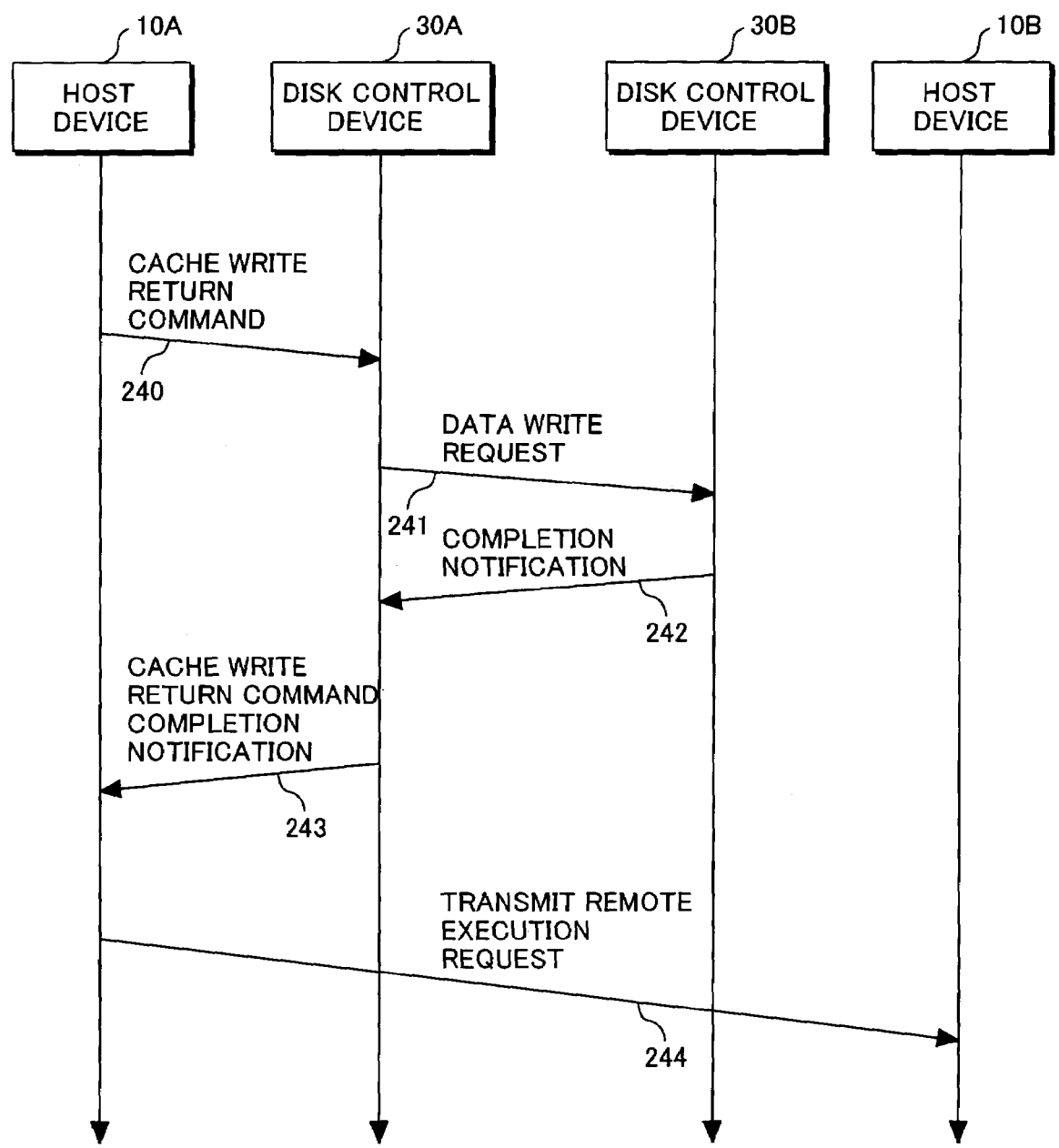
FIG. 17 is a sequence diagram showing the operation when the host device 10A requests the remote device 10B to remotely execute the application in the second embodiment.

FIG. 17 is a sequence diagram showing the operation when the host device 10A requests the remote device 10B to remotely execute the application in the second embodiment.

As shown in FIG. 16, the disk control device 30A temporarily stores a portion of the latest data, that has been stored on the virtual disk, into the disk cache 36A. However, the contents of the disk device 50B connected to the remote disk control device 30B do not always match the latest data in the disk cache 36A. Therefore, prior to requesting the remote host device 10B to remotely run the application software, the host device 10A executes the cache write-back command (240) so that the (data) contents of the disk device 50B will match the contents of the disk cache 36A.

The cache write-back command is composed of two types. A first type command is an instruction to write back all data held on the disk cache 36A into the disk. This first type command does not contain any parameters to limit the target data that will be written back (to the disk device). A second type command contains parameters that limit the target data to be written back into the other device. For example, the second type command contains parameters specifying the disk. When the second type command has been issued, only the cache data specified with the parameter is transferred to the disk device 50B.

When the disk control device receives the cache write-back command from the host device 10A, it requests the remote disk control device 30B to write cache data according to the cache write-back command (241). Cache data for this request is then sent from the disk control device 30A to the disk control device 30B. This cache data is then written into the disk device 50B by the disk control device 30B. When the data writing ends normally, a data write completion notification is sent back to the disk control device 30A from the disk control device 30B (242). The host device 10A is then notified by the disk control device 30A that the cache write-back command has been completed (243).

The host device 10A waits for notification of completion of the cache write-back command and requests the remote host device 10B to remotely execute the specified application (244). The host device 10A can, in this way, search the disk device 50 that holds the most recent data and process the data according to the application program.

FIG. 18 shows the structure of the disk control table 43 that is searched by the virtual disk controller 41.

The host control table 43 is made up of multiple entries 430-1, 430-2, . . . holding the disk identifiers 431 for recognizing the host device. The entries shown are the Disk capacity 432, Disk type 433, Transmit control (contact status) 434, Remote disk control device identifier 435, Remote disk identifier is 436, and the Transfer status flag 437.

The virtual disk controller 41 allows disks that have a disk identifier 431 registered in the disk table 431 to access the host device 10A. The virtual disk controller 41 replies to inquiries about the (disk) capacity and disk type from the host device 10A, with the capacity shown in Disk capacity 432 and type shown in Disk type 433.

In this embodiment, the (command) Transmit control information 434 is a code set with the connection status for showing whether the disk itself is a virtual disk connected to the remote disk control device, or, as in the first embodiment, whether it is a local disk actually connected to the disk control device 30A. The Transfer status flag 437 is set by the latter described disk transfer controller 45 to show whether or not the data stored on the local disk is transferring to the remote disk. A "1" flag is set for local disks with data being transferred, and a "0" flag is set for other local disks and virtual disks. The Remote disk control device identifier 435 and the Remote disk identifier 436 are set from the SVP80, in the table entry for the local disk with data transfer in progress. When transfer of data is complete, the Transmit control information (connection status code) 434 changes to virtual disk status.

When the host device 10A issues a disk access request (read/write command), the virtual disk controller 41 accesses the disk cache 36A. The virtual disk controller 41 searches the disk control table 43 and then determines the target access disk in control information 434. When the access target is a virtual disk, access is requested to the remote disk shown by the identifier 436 for the remote disk device shown by the identifier 435. When the access target is a local disk, normal read/write access is requested to the local disk within the disk device 0A.

Figure 19:
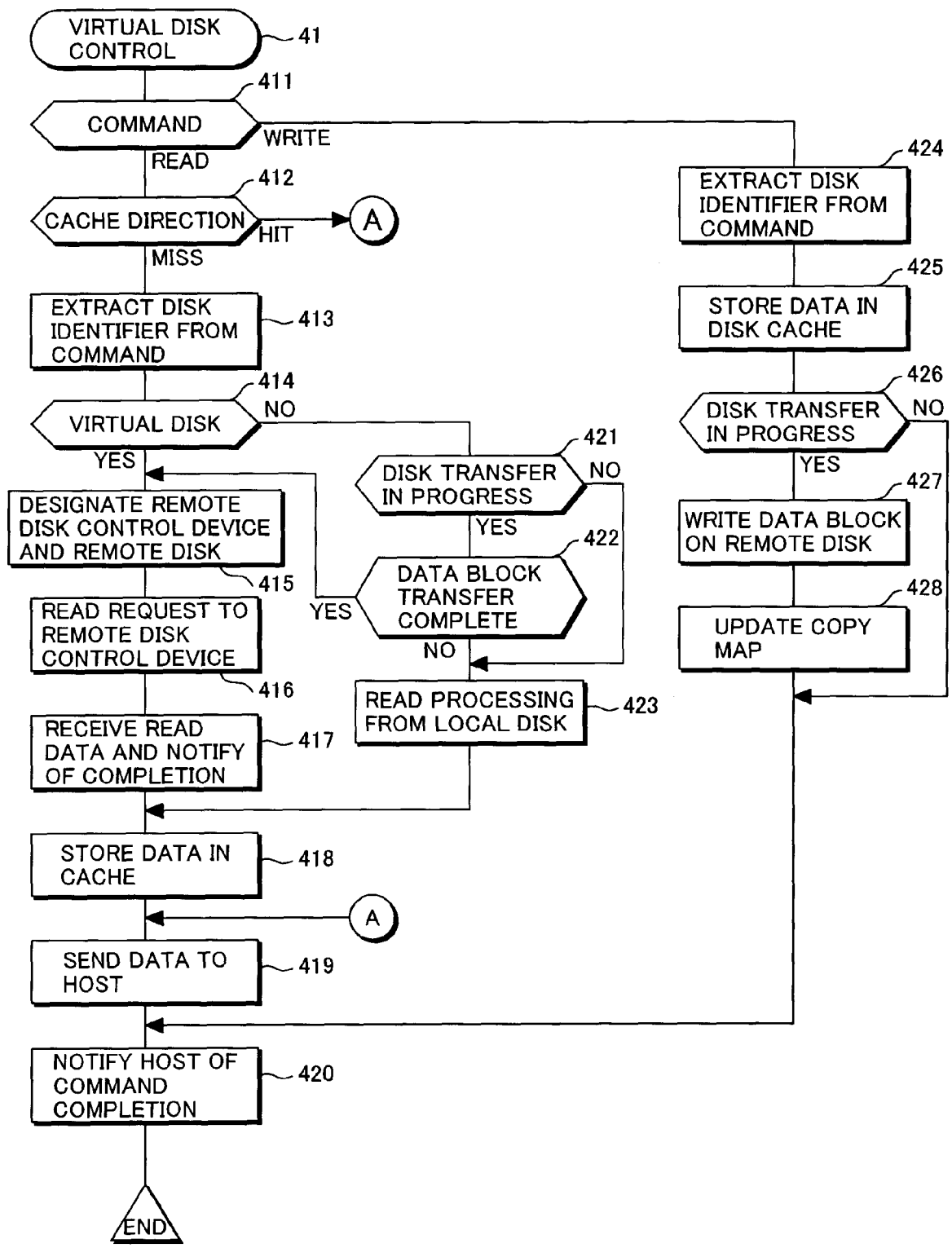
FIG. 19 is a flow chart of the virtual disk controller 41 contained in the host device 10A of the second embodiment.

FIG. 19 is a flow chart showing the operation of the virtual disk controller 41 (program routine).

The virtual disk controller 41 analyzes the command received from the host device 10A (step 411). If it is a write command, then the disk identifier is extracted from the access target disk (424) and the data is stored in the disk cache (425). The virtual disk controller 41 next searches the disk control table shown in FIG. 18. The virtual disk controller 41 decides on the transfer status flag 437 of entry 430 that corresponds to the above disk identifier (426). If the transfer status flag 437 is "0", then the host device 10A is notified of command completion (420) and this routine ends.

When the transfer status flag 437 is "1", the most recent data stored in the data cache by the write command is written in the remote disk in one block units or multiple block units of cache data (427). After the copy map 47, to be described later with reference to FIG. 20, is rewritten (428), the process proceeds to step 420. The data blocks are written on the remote disk by transmitting the command to write data on the remote disk showing the identifier 436, to the remote disk control device showing the identifier 435 in the table entry 430-i.

When the received command is a read command from the host device 10A, a decision is made to determine whether or not the target data is stored in the disk cache 36A (412). If the target data is present in the disk cache (hit), then the target data loaded from the disk cache is sent to the host device 10A (419). The host device 10A is afterwards notified that the command is completed (420) and this routine then ends.

When the target data is not in the disk cache, the disk identifier for the disk to be accessed is extracted from the read command (413). The disk identifier and corresponding entry 430-*i* on the disk table 43 are searched and the control information is determined (414). When the target disk for accessing is the local disk, the transfer status flag 437 is decided (421). If the transfer status flag is "0", then the normal data read process shown by the identifier 431 is executed from the local disk (423). After storing the loaded data in the cache (418), step 419 is executed.

When the transfer status flag 437 in table entry 430-*i* is "1", then a decision is made as to whether or not data transfer of the target data to the remote disk from the copy map 47, to be described later, on is already complete (422). If the target data is in a state prior to transfer to the remote disk, then the normal data read process is executed (423). However, if the target data has been transferred, then step 415 is executed.

If the disk for accessing is a virtual disk, or the target access disk is a local disk, and the target data is already transferred to the remote disk, then the remote disk control device and remote disk are specified according to the identifiers 435 and 436 shown by table entry-i (415), and a request is made to the applicable remote control device to read data from the remote disk (417).

The virtual disk controller awaits a reply from the remote disk control device. When the virtual disk controller receives notification of read data completion (417), it stores the received data in a cache (418) and then executes step 419. In this way, the disk control device 30A can operate as if the target disk for accessing is easily available to the host device 10A, even when the target disk for accessing is a virtual disk connected to the remote disk control device 30B. Furthermore, the remote disk device can be effectively utilized for data read and write.

FIG. 20 shows the structure of the copy map 47.

The copy map 47, for example, shows by flag status, whether or not local disk data has been transferred (copied) to the remote disk in data blocks which are the minimum access unit on a disk. Each flag of the copy map 47 corresponds to a data block region on the local disk. Whether or not transfer (copy) of a data block for access has finished can be decided by setting a "1" flag in a region where transfer is complete. The flag state is rewritten from "0" to "1" in step 428 by the virtual disk control routine 41, as shown in using FIG. 19, and in the disk transfer control routine 45, as shown in FIG. 21.

Figure 21:
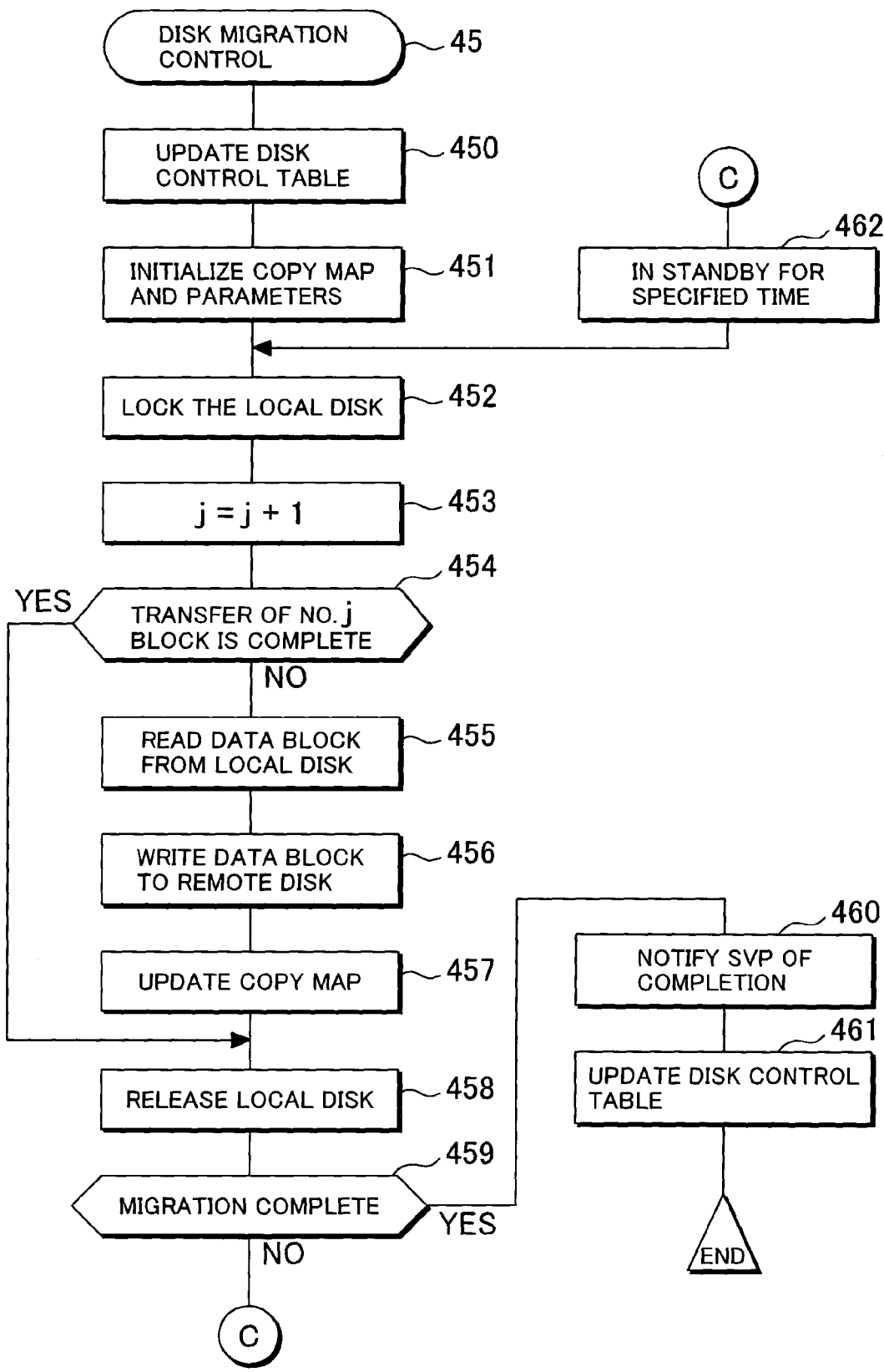
FIG. 21 is a flow chart of operation of the disk transfer controller 45 operation in the host device 10A of the second embodiment.

FIG. 21 is a flow chart of the operation of the disk migration controller (program routine 45). The disk migration controller 45 is started by the disk migration command sent from the SVP80. The identifier of the local disk comprising the data source, the identifier of the remote disk comprising the data transfer destination, and the remote disk controller identifier are specified with the disk migration command.

The transfer (copy) of data onto the remote disk from the local disk, for example, is performed sequentially in data block units from the beginning block to the final block of the disk. The flags on the copy map 47 are sequentially set to "1". However, if a data write has occurred from the host device to the remote disk during a data transfer, then in step 427 of the virtual disk control routine 41, as described using FIG. 19, the applicable data block has already been copied onto the remote disk, so that non-consecutive flag settings are added to the copy map 47 by the virtual disk control routine.

The disk migration controller 45, first of all, sets the remote disk controller identifier and remote disk identifier specified by the disk migration command in the entry fields 435 and 436 holding the local disk identifiers on the disk control table 43. The disk migration controller 45 also changes the transfer status flag 437 to a "1" (450), and initializes the value of parameter j showing the target transfer block (451).

The local disk comprising the database is next locked to prevent it from being accessed from the host device (452). After incrementing the parameter value (455), the copy map is searched and a decision is made to determine whether the j block as the target for transfer has already been copied (454).

When the j block has already been copied, access from the host device is allowed so that the local disk is released (458), and by comparing the parameter j value with the maximum number of blocks, a decision is made as to whether the migration processing of all data blocks is complete or not (459). If migration processing is not complete, then migration processing is stopped (462) until a specified time has elapsed. After the specified time has elapsed, the process returns to step 452 and the above-described operation is repeated. The command received from the host device shown in FIG. 19 is executed in the period that the disk migration controller 45 is in a stop status.

When copying of the j block is not finished, the j block data is loaded from the local disk (455). The data block is then written on the remote disk by sending a data write command to the remote disk controller specified in the disk migration command (456). The flag corresponding to the j block on the copy map is then changed to a "1" (copy map change: 457), the local disk is released (458) and a decision is made as to whether migration processing for all data blocks is complete or not (459).

The data blocks on the local disk are transferred one after another to the remote disk by repeating the above processing. When transfer of all data blocks is finished, the SVP80 is notified that transfer is complete (460). The control information 434 corresponding to the local disk of the disk control table 43 is changed to a virtual disk. The transfer status flag 437 is changed to a "0" (461) and this routine ends.

Figure 22:
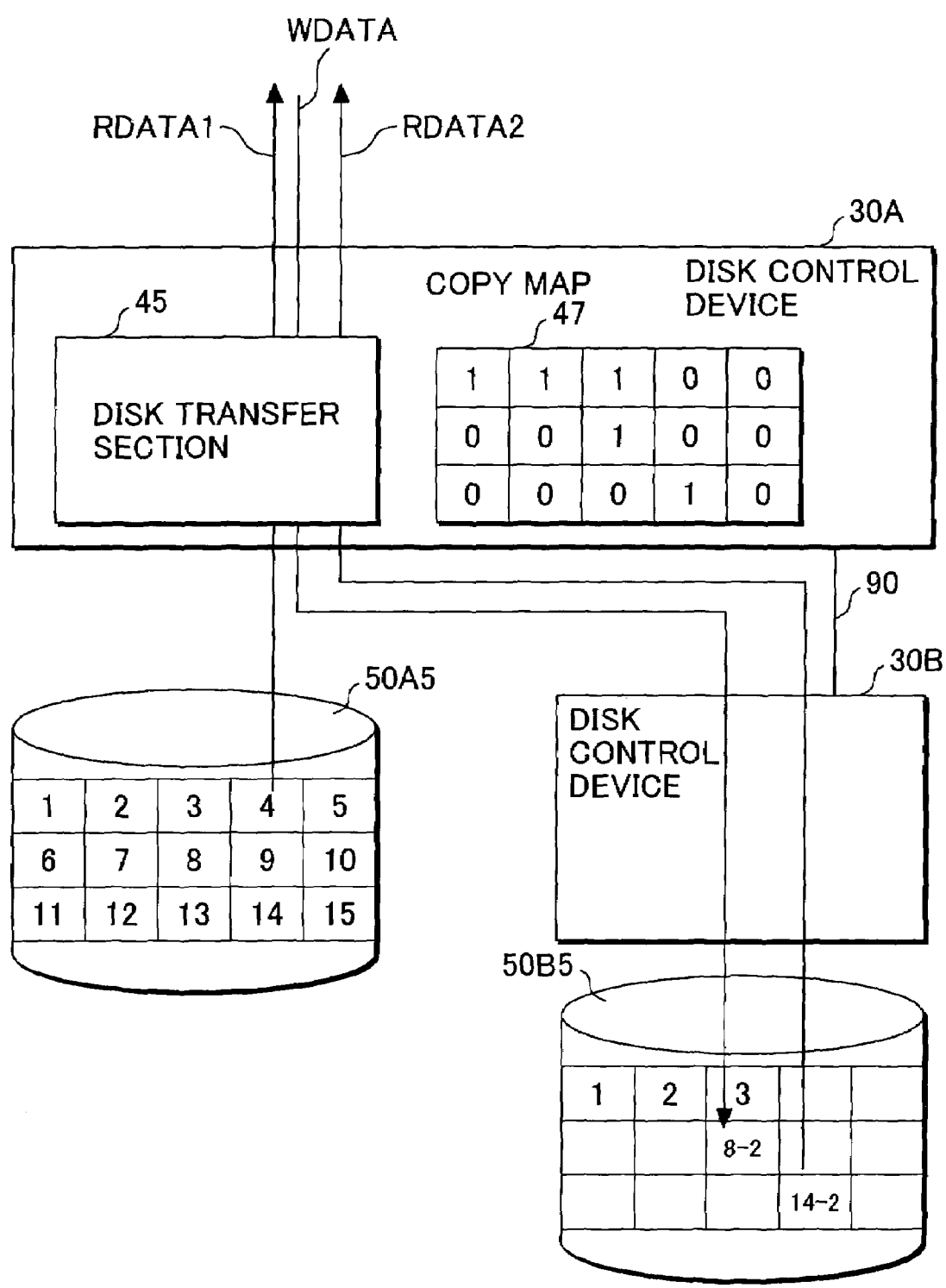
FIG. 22 is a conceptual block diagram of data read/write operation in the second embodiment.

FIG. 22 is a conceptual diagram of the disk transfer controller 45 in the second embodiment.

When the disk transfer controller 45 of the disk control device 30 receives a read request from the host device 10A, and the target data matches a data block prior to transfer (copy), then the target data RDATA1 loaded from the local disk 50A1 is sent back to the host device. When the target data matches a data block whose transfer (copy) is complete, then the read request is sent back to the remote disk control device 30B and the data RDATA2 loaded from the remote disk 50B5 is transferred to the host device 10A. When a write request for the local disk 50A5 that is currently transferring data is received from the host device 10A, the disk transfer controller 45 sends a write request to the remote disk control device 30B, and writes the data WDATA into the remote disk 50B5.

In the second embodiment, the virtual disk allows the host device 10A and the remote host device 10B to share data. In this case, the host device 10A does not require a disk device as hardware, since it uses a virtual disk, and, therefore, data can be jointly shared at a low cost. In the example provided by the second embodiment, the disk control device 30A on the host device 10A side contained a virtual disk controller 41. However, the virtual disk controller 41 may be installed in the disk control device 30B on the remote host device side.

As company operations become more streamlined, outsourcing is becoming more widespread. Outsourcing is the commissioning of another company (data center, etc.) to perform computer processing that was previously all performed within one's own company. However, information processing that was, up until then, correctly performed within the company, might not always be correct when performed on another computer system. Therefore, some system administrators strongly resist outsourcing of all of their information processing all at once to another computer system.

In the second embodiment of the present invention, the contents of the local disk connected to the host device 10A are transferred (copied) to a remote disk. The local disk can then be utilized as a virtual disk since transfer of its data is already finished. This also allows outsourcing of information processing work to be performed in stages. The transfer of data for outsourcing, for example, may be performed in the following stages.

In a first stage, the virtual disk controller 41 of the present invention is utilized by the customer disk control device 30A whose local disk has insufficient remaining capacity. A section of the remote disk device 50B possessing ample disk capacity is therefore utilized here as a virtual disk in the customer's host device 10A. As viewed by the customer's host device 10A, the local disk capacity appears to have increased.

The disk device acquired by leasing or purchase is typically operated as hardware incorporated into the computer system. However, the virtual disk is a disk region not belonging to the concept known in the related art. The virtual disk, for example, may be leased by contract to a customer and the customer then billed. A system may be adopted for billing for the virtual disk according to the amount of memory leased or the number of disks leased to the customer. This system allows outsourcing that utilizes the customer's own computer system.

In a second stage, as described in connection with the second embodiment, data, such as a database stored up until then in a local disk, is migrated (copied) to a remote disk under the control of the host device 10 as the scheduled destination for outsourcing. Only the data is transferred in this case, and the host device 10A operated by the customer can access the local disk as if it were a virtual disk so there is no need whatsoever to change the settings on the host device. Therefore, there is little possibility of problems arising when running the application on the customer's computer system.

In a third stage, functions of the host device 10A are all completely migrated to the remote host device 10B. Transfer (copy) of data in the second stage has been completed so that a test run can be made on the host device 10B at the outsourcing destination on software identical to the application running on the customer's host device 10A. The processing on the remote host device, in this way, can be guaranteed. The data processing on the customer's host device 10A can continue even during the period where host functions are being transferred. Switching to outsourcing in the third stage can proceed in a comparatively smooth operation since there is no need to make large changes in the application being run at the (data) transfer destination.

In the second embodiment, the disk transfer controller 45 changed from the local disk on the disk table 43 to a virtual disk when all data on the local disk was transferred to the remote disk. However, the storage status of data on the local disk and remote disk is identical at this time, so that an environment is provided where identical applications can be run on the host device 10A and host device 10B.

Therefore, when utilizing the disk transfer controller 45 function for the purpose of using a remote disk under the same conditions as the local disk to remotely run a database application of the first embodiment, at the point when all data copy has been completed, instead of rewriting the disk control table (461), new entries may be registered in the remote copy table 35 of the first embodiment.

In the remote copy process 320 shown in FIG. 9 and FIG. 10 for the first embodiment, when the read/write command is received from the host device, the usual read/write process (328) is executed, except when there is a write command for writing onto the target remote copy disk registered in the remote copy table 35A. However, by running the virtual disk controller 4 shown in FIG. 19 instead of the read/write process (328), the functions of the first embodiment and the functions of the second embodiment can also both be provided in one disk control device.

In the embodiment, a dedicated channel was connected between the disk control devices, and communication of the read/write commands was performed over the dedicated channel. However, the communication of the read/write commands may be performed over a network connecting the host devices.

As clearly shown by the above described embodiments, the present invention effectively allows joint use of data required when executing identical applications on multiple host devices.

What is claimed is:

1. A data sharing method for sharing data between a first host computer and a second host computer, the first host computer having a first disk control device, a first database application and a first database system, the first database system including a first remote execution program, and the second host computer having a second disk control device, a second database application and a second database system, the second database system including a second remote execution program, the method comprising:

executing a copy direction invert command to the first disk control device to invert a copy direction of data between the first disk control device and the second disk control device, wherein the first host computer executes the copy direction invert command using the first remote execution program;

executing a copy direction invert request to the second disk control device to invert the copy direction in response to the copy direction invert command, wherein the first disk control device executes the copy direction invert request;

inverting the copy direction and issuing a complete response to notify the first disk control device that inverting has occurred;

issuing a command completion response to notify the first host computer of completion of the copy direction invert command, and upon receipt of the command completion response, closing access to the first database system, such that simultaneous execution of the first database application and the second database application is prevented;

issuing a remote execution request to the second host computer in response to the command completion response, wherein the first host computer executes the remote execution request using the first remote execution control program;

executing a command to access the second disk control device in response to issuing the remote execution request to the second host computer;

determining whether or not the second disk control device is designated as a primary disk control device; and if the second disk control device is designated as a primary disk control device, then accessing the second disk control device, wherein if the second disk control device is not designated as a primary disk control device, then the second disk control device is not accessed.

2. A data sharing method according to claim 1, further comprising:

copying, in data blocks, stored data on a specified disk connected to said first disk control device onto a specified disk of said second disk control device;

before the copying of all data blocks is complete, when target data is not in a disk cache, and if a data block matching said target data is still not copied onto the specified disk connected to the second disk control device, then using the first disk control device, having received a data read command from said first host computer for said specified disk connected to said second disk control device, to send back data loaded from said specified disk connected to said first disk control device to said first host computer, wherein a status indicator, which includes flags indicating whether or not copying of the data blocks is complete, is maintained; and if a data block matching said target data has already been copied onto said specified disk of said second disk control device, then requesting the second disk control device to load the target data and send back the received target data to the first host computer.

3. A data sharing method according to claim 2, wherein before the copying of all data blocks is finished, said first disk control device, having received the data write command from said first host computer for writing data onto a specified disk, temporarily stores the write data into a disk cache and then requests said second disk control device to write the stored data into the data blocks of the disk control device matching said write data.

4. A data sharing method for sharing data between a first host computer and a second host computer, the first host computer having a first disk control device, a first database application and a first database system, the first database system including a first remote execution program, and the second host computer having a second disk control device, a second database application and a second database system, the second database system including a second remote execution program, and wherein said first disk control device includes a first control table containing a pair of disk identifiers for a local disk used by the first host computer and a corresponding remote disk used by said second host computer and control information indicating a copy direction in each pair of the local disk and the remote disk, and wherein said second disk control device includes a second control table containing the pair of disk identifiers and said control information, the method comprising the steps of:

executing, in said first disk control device, a first data write command issued from said first host computer to update the stored data of the local disk and transmitting the first data write command to said second disk controller to update data of the remote disk, which corresponds to data updated by said first disk control device, according to the copy direction designated by said control information in said first control table;

executing a control procedure for inverting the copy direction by changing said control information on said first and second control tables in response to a copy direction invert command issued by said first host computer using the first remote execution program;

issuing a command completion response to notify the first host computer of completion of the control procedure for inverting the copy direction, and upon receipt of the command completion response, closing access to the first database systems, such that simultaneous execution of the first database application and the second database application is prevented;

issuing a request for remote data processing, wherein said first host computer issues said request to said second host computer, and wherein the first host computer requests the remote data processing using the first remote execution program;

determining whether or not the control information indicates that the second disk control device is a primary disk control device; and if the control information indicates that the second disk control device is a primary disk control device, then in response to a second data write command issued by said second host computer based on the request for remote data processing, writing data onto the remote disk to update data stored in the remote disk and transmitting the second data write command to the first disk controller in order to update data of the local disk, which is corresponding to data updated by said second disk control device, according to the reversed copy direction designated by the changed control information in said second control table, wherein if the control information does not indicate that the second disk control device is a primary disk control device, then data is not written onto the remote disk.

5. A data sharing method according to claim 4, wherein said control procedure for inverting the copy direction includes an inquiry on whether inverting the copy direction from said first disk control device to said second disk control device is possible or not, and also an acceptance reply received from said second control device, accompanied by a request to invert the copy direction from said first disk control device to said second disk control device.

* * * * *